US011838938B2

(12) United States Patent
Lou et al.

(10) Patent No.: US 11,838,938 B2
(45) Date of Patent: Dec. 5, 2023

(54) COLLISION MITIGATION PROCEDURES FOR GRANT-LESS UPLINK MULTIPLE ACCESS

(71) Applicant: INTERDIGITAL PATENT HOLDINGS, INC., Wilmington, DE (US)

(72) Inventors: Hanqing Lou, Syosset, NY (US); Xiaofei Wang, Cedar Grove, NJ (US); Rui Yang, Greenlawn, NY (US); Mihaela C. Beluri, Jericho, NY (US); Janet A. Stern-Berkowitz, Little Neck, NY (US)

(73) Assignee: INTERDIGITAL PATENT HOLDINGS, INC., Wilmington, DE (US)

(*) Notice: Subject to any disclaimer, the term of this patent is extended or adjusted under 35 U.S.C. 154(b) by 441 days.

(21) Appl. No.: 17/108,642

(22) Filed: Dec. 1, 2020

(65) Prior Publication Data

US 2021/0168819 A1    Jun. 3, 2021

Related U.S. Application Data

(63) Continuation of application No. 16/475,818, filed as application No. PCT/US2018/012607 on Jan. 5, 2018, now abandoned.
(Continued)

(51) Int. Cl.
*H04W 72/08* (2009.01)
*H04W 72/541* (2023.01)
(Continued)

(52) U.S. Cl.
CPC ......... *H04W 72/541* (2023.01); *H04L 5/0055* (2013.01); *H04W 4/70* (2018.02); *H04W 74/085* (2013.01)

(58) Field of Classification Search
CPC ...... H04L 5/0007; H04L 1/1887; H04W 4/70; H04W 74/08; H04W 72/1268;
(Continued)

(56) References Cited

U.S. PATENT DOCUMENTS 10,554,329 B2 * 2/2020 Davydov .............. H04L 1/1812
10,581,572 B2 * 3/2020 Chendamarai Kannan ................
H04L 5/0053
(Continued)

FOREIGN PATENT DOCUMENTS

| WO | 2015044405 A1 | 4/2015 |
| WO | 2015142932 A1 | 9/2015 |
| WO | 2016/167828 | 10/2016 |

OTHER PUBLICATIONS

Nokia et al., "Basic Principles of Contention-Based Access," 3GPP TSG-RAN WG1 #86, R1-167252, Gothenburg, Sweden (Aug. 22-26, 2016).
NTT Docomo, Inc., "SLS evaluation on uplink multiple access," 3GPP TSG RAN WG1 Meeting #86bis, R1-1610077, Lisbon, Portugal (Oct. 10-14, 2016).
(Continued)

*Primary Examiner* — Jung Liu
(74) *Attorney, Agent, or Firm* — Volpe Koenig

(57) ABSTRACT

A wireless transmit/receive unit (WTRU) may receive configuration information for a first set of resources and a second set of resources for a grantless physical uplink shared channel (PUSCH) transmission. The WTRU may determine data for transmission using the grantless PUSCH transmission. Based on the data, the WTRU may select resources from the first set or the second set for the grantless PUSCH transmission. Further, the WTRU may send the grantless PUSCH transmission including the data using the selected resources. In an example, the sending of the grantless PUSCH transmission may be part of a random access
(Continued)

procedure. The random access procedure may be a two-step random access procedure. The random access procedure may be a random access channel (RACH) procedure. The random access procedure may depend upon a double contention pool setting, and the setting may address at least one of a data pool or a control pool.

20 Claims, 16 Drawing Sheets

Related U.S. Application Data

(60) Provisional application No. 62/565,576, filed on Sep. 29, 2017, provisional application No. 62/443,389, filed on Jan. 6, 2017.

(51) Int. Cl.
  *H04W 4/70* (2018.01)
  *H04L 5/00* (2006.01)
  *H04W 74/08* (2009.01)

(58) Field of Classification Search
  CPC ........... H04W 74/0816; H04W 72/566; H04W 72/23; H04W 72/0446; H04W 72/12; H04W 72/04; H04W 72/115
  See application file for complete search history.

(56) References Cited

U.S. PATENT DOCUMENTS

| | | | |
|---|---|---|---|
| 10,764,914 B2* | 9/2020 | Li | H04W 72/115 |
| 10,873,975 B2* | 12/2020 | Freda | H04W 74/0833 |
| 10,972,974 B2* | 4/2021 | Xiong | H04W 72/1268 |
| 2014/0369294 A1 | 12/2014 | Seo et al. | |
| 2017/0367110 A1* | 12/2017 | Li | H04L 5/0007 |
| 2018/0041957 A1* | 2/2018 | Xiong | H04W 76/28 |
| 2018/0167161 A1* | 6/2018 | Davydov | H04L 1/0001 |
| 2018/0175986 A1* | 6/2018 | Chendamarai Kannan | H04L 5/0057 |
| 2019/0174472 A1 | 6/2019 | Lee et al. | |
| 2019/0289621 A1* | 9/2019 | Li | H04W 74/0816 |
| 2019/0312704 A1 | 10/2019 | Rico Alvarino et al. | |
| 2019/0320467 A1* | 10/2019 | Freda | H04L 5/0055 |
| 2020/0068511 A1 | 2/2020 | Yang et al. | |

OTHER PUBLICATIONS

Samsung, "Support of HARQ in grant-free based multiple access," 3GPP TSG RAN WG1 Meeting #86, R1-1609039, Lisbon, Portugal (Oct. 10-14, 2016).
Third Generation Partnership Project, "Technical Specification Group Radio Access Network; Evolved Universal Terrestrial Radio Access (E-UTRA); Medium Access Control (MAC) protocol specification (Release 14)," 3GPP TS 36.321 V14.1.0 (Dec. 2016).
Third Generation Partnership Project, "Technical Specification Group Radio Access Network; Evolved Universal Terrestrial Radio Access (E-UTRA); Medium Access Control (MAC) protocol specification (Release 14)," 3GPP TS 36.321 V14.4.0 (Sep. 2017).
Third Generation Partnership Project, "Technical Specification Group Radio Access Network; Evolved Universal Terrestrial Radio Access (E-UTRA); Radio Resource Control (RRC); Protocol specification (Release 14)," 3GPP TS 36.331 V14.0.0 (Sep. 2016).
Third Generation Partnership Project, "Technical Specification Group Radio Access Network; Evolved Universal Terrestrial Radio Access (E-UTRA); Radio Resource Control (RRC); Protocol specification (Release 14)," 3GPP TS 36.331 V14.4.0 (Sep. 2017).
Third Generation Partnership Project, "Technical Specification Group Radio Access Network; NR; Medium Access Control (MAC) protocol specification (Release 15)," 3GPP TS 38.321 V15.0.0 (Dec. 2017).
Third Generation Partnership Project, "Technical Specification Group Radio Access Network NR Radio Resource Control (RRC) protocol specification (Release 15)," 3GPP TS 38.331 V15.0.0 (Dec. 2017).
Third Generation Partnership Project, "Technical Specification Group Radio Access Network; Evolved Universal Terrestrial Radio Access (E-UTRA) and Evolved Universal Terrestrial Radio Access etwork (E-UTRAN); Overall description; Stage 2 (Release 14)," 3GPP TS 36.300 V14.1.0 (Dec. 2016).
Third Generation Partnership Project, "Technical Specification Group Radio Access Network; Evolved Universal Terrestrial Radio Access (E-UTRA) and Evolved Universal Terrestrial Radio Access Network (E-UTRAN); Overall description; Stage 2 (Release 14)," 3GPP TS 36.300 V14.4.0 (Sep. 2017).
Third Generation Partnership Project, "Technical Specification Group Radio Access Network; NR; NR and NG-RAN Overall Description; Stage 2 (Release 15)," 3GPP Ts 38.300 V1.0.1 (Oct. 2017).

* cited by examiner

COLLISION MITIGATION PROCEDURES FOR GRANT-LESS UPLINK MULTIPLE ACCESS

CROSS REFERENCE TO RELATED APPLICATIONS

This application is a continuation of U.S. patent application Ser. No. 16/475,818, filed Jul. 3, 2019, which is the U.S. National Stage, under 35 U.S.C. § 371, of International Application No. PCT/US2018/012607 filed Jan. 5, 2018, which claims the benefit of U.S. Provisional Application No. 62/443,389 filed Jan. 6, 2017 and U.S. Provisional Application No. 62/565,576 filed Sep. 29, 2017, the contents of which are hereby incorporated by reference herein.

BACKGROUND

For each generation of wireless protocols, standards are developed to address mobile communications needs for future technologies. Enhanced mobile broadband (eMBB), massive machine-type communications (mMTC) and ultra-reliable-and-low-latency communications (URLLC) are several examples of technology that may demand specific performance requirements. These examples may require standards, such as the design of new modulation and coding schemes, waveforms, feedback processes, beamforming mechanisms, as well as new multiplex access methods.

Applications for a new generation of wireless technology, New Radio (NR), also known as Next Generation Radio or Fifth Generation (5G), can be summarized under three main categories: eMBB, mMTC and URLLC. Under each category, there are a wide set of applications that are considered for various needs and deployment scenarios that mandate specific performance requirements. For example, mMTC and URLLC applications range from automotive to health, agriculture, utilities and logistics industries. Realization of mMTC and URLLC features may require the design of new modulation and coding schemes, waveforms, feedback processes, beamforming mechanisms, as well as new multiplex access methods.

For mMTC applications, it is expected that the system would be able to support up to one million mMTC devices per square kilometer, but transmission delay for such applications is not as critical as for other applications. For URLLC applications, the user equipment (UE) or wireless transmit/receive unit (WTRU) density per cell is significantly less but such applications call for a target delay of shorter than 1 millisecond (ms), along with a high reliability of 10-5 error probability for a 32 byte message. Despite the differences of these two use cases, they both require a new uplink multiple access (MA) method to enable them to achieve their target performance indicators.

SUMMARY

A system, method, and device may transmit data using grant-less (GL) transmissions. Specifically, a base station may send a GL transmission configuration to a wireless transmit/receive unit (WTRU) that may include a first indication of a first set of resource blocks (RBs) for a first resource pool and a second indication of a second set of RBs for a second resource pool. The base station may be a next generation Node-B (gNB). The WTRU may then select a subset of RBs in the first set and may determine a subset of RBs in the second set based on the selected subset of RBs in the first set. Further, the WTRU may transmit UL data to the base station via the determined subset of RBs in the second set. The base station may determine whether the UL data has been received successfully from the WTRU. If the UL data has not been received successfully, the base station may determine, based on a first resource pool to second resource pool mapping, whether the WTRU and another WTRU have selected the subset of RBs of the second set. If the WTRU and another WTRU have selected the subset of RBs of the second set, the base station may transmit a negative acknowledgement (NAK) with a third indication for a first transmission failure reason. If the WTRU and another WTRU have not selected the subset of RBs of the second set, the base station may transmit a NAK with a third indication for a second transmission failure reason. The WTRU may then adjust a backoff and determine a retransmission scheme based on the received third indication. Further, the WTRU may retransmit the UL data to the base station using the adjusted backoff and the determined retransmission scheme.

In a further example, a total number of RBs in the first set may be greater than a total number of RBs in the second set. In an additional example, the first resource pool may be for at least one of WTRU identity (ID) information and control information for the WTRU, and the second resource pool may be for data information.

Further, the subset of RBs in the first set may be selected randomly. Also, the subset of RBs in the first set may be selected using a random access procedure and a backoff procedure. In an example, the random access procedure and the backoff procedure may be based on one or more of a WTRU priority, a traffic type of UL data, and the received one or more GL transmission configurations.

In addition, the first transmission failure reason may be due to UL collision and the second transmission failure reason may be due to UL low Signal-to-Noise Ratio (SNR). Further, if the third indication is for the first transmission failure reason, the adjustment may be increasing the backoff and the retransmission of the UL data may be self-decodable. Also, if the third indication is for the second transmission failure reason, the adjustment may be decreasing the backoff and the retransmission of the UL data may use incremental redundancy (IR)/Chase combining (CC) hybrid automatic repeat request (HARQ) combining.

In another example, a time period between the reception of the GL configuration and a transmission of the UL data may be based on a backoff. Also, a time period between a transmission of the UL data and a retransmission of the UL data may be based on a backoff. Further, adjusting the backoff may include adjusting a backoff impact factor. In addition, the NAK may be an RB based NAK.

In a further example, the WTRU may transmit at least one of WTRU ID information for the WTRU and UL control information for the WTRU, via the selected subset of RBs in the first set, to a base station. In an example, the control information for the WTRU may include the WTRU ID. Also, the RBs may be within an RB group (RBG). Also, the mapping may use WTRU ID information for both WTRUs. In an additional example, if the UL data has been received successfully by the base station, the base station may send an acknowledgement (ACK) to the WTRU.

A WTRU may receive configuration information for a first set of resources and a second set of resources for a grantless physical uplink shared channel (PUSCH) transmission. The WTRU may determine data for transmission using the grantless PUSCH transmission. Based on the data, the WTRU may select resources from the first set or the second set for the grantless PUSCH transmission. Further, the WTRU may send the grantless PUSCH transmission including the data using the selected resources.

In an example, the sending of the grantless PUSCH transmission may be part of a random access procedure. Further, the random access procedure may be a two-step random access procedure. Also, the random access procedure may be a random access channel (RACH) procedure. Moreover, the random access procedure may depend upon a double contention pool setting, and the setting may address at least one of a data pool or a control pool. In addition, the random access procedure may depend upon collision conditions.

In a further example, the configuration information may be received in a broadcast message. Further, the configuration information may be received in a radio resource control message. Also, the WTRU may use dual carrier modulation to send the grantless PUSCH transmission. Moreover, the WTRU may maintain a collision counter.

BRIEF DESCRIPTION OF THE DRAWINGS

A more detailed understanding may be had from the following description, given by way of example in conjunction with the accompanying drawings, wherein like reference numerals in the figures indicate like elements, and wherein:

FIG. 10 is a flow diagram illustrating an example procedure for collision detection and signaling;

DETAILED DESCRIPTION

Figure 1A:
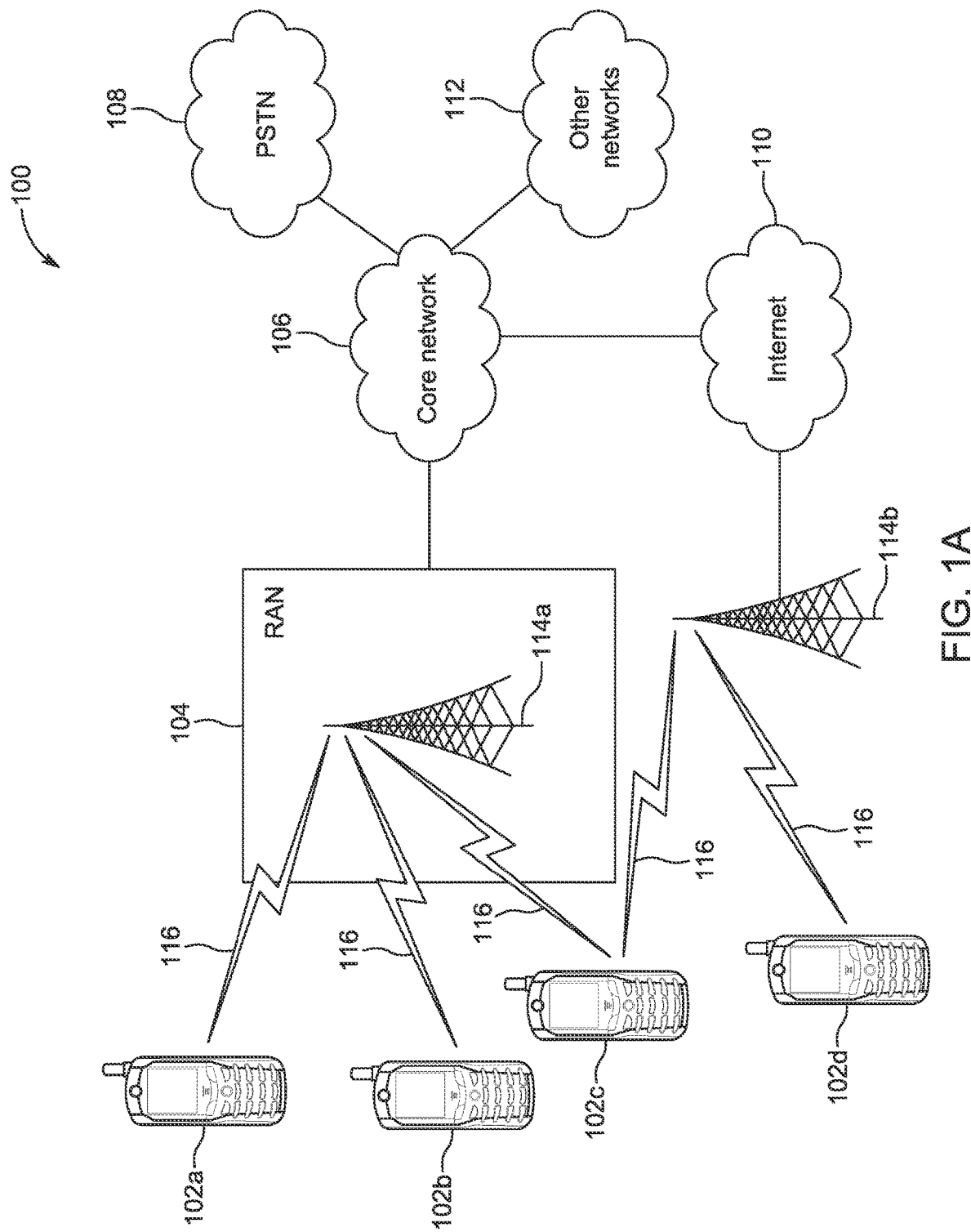
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word discrete Fourier transform spread orthogonal frequency division multiplexing (ZT UW DTS-s OFDM), unique word OFDM (UW-OFDM), resource block-filtered OFDM, filter bank multi-carrier (FBMC), and the like.

As shown in FIG. 1A, the communications system 100 may include wireless transmit/receive units (WTRUs) 102a, 102b, 102c, 102d, a radio access network (RAN) 104/113, a core network (CN) 106/115, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a station (STA), may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (for example, remote surgery), an industrial device and applications (for example, a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106/115, the Internet 110, and/or the other networks 112. By way of example, the base stations 114a, 114b may be a base transceiver station (BTS), a Node-B, an eNode-B, a Home Node B, a Home eNode-B, a next generation Node-B (gNB), a new radio (NR) NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104/113, which may also include other base stations and/or network elements (not shown), such as a base station controller (BSC), a radio network controller (RNC), relay nodes, etc. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (for example, radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104/113 and the WTRUs 102a, 102b, 102c may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed Uplink (UL) Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using NR.

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (for example, an eNode-B and a gNB). An eNode-B may be referred to as an eNB and the terms may be used interchangeably herein.

In other embodiments, the base station 114a and the WTRUs 102a, 102b, 102c may implement radio technologies such as Institute for Electrical and Electronic Engineers (IEEE) 802.11 (i.e., Wireless Fidelity (WiFi)), IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode-B, or access point, for example, and may utilize any suitable RAT for facilitating wireless connectivity in a localized area, such as a place of business, a home, a vehicle, a campus, an industrial facility, an air corridor (for example, for use by drones), a roadway, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (for example, WCDMA, CDMA2000, GSM, LTE, LTE-A, LTE-A Pro, NR etc.) to establish a picocell or femtocell. As shown in FIG. 1A, the base station 114b may have a direct connection to the Internet 110. Thus, the base station 114b may not be required to access the Internet 110 via the CN 106/115.

The RAN 104/113 may be in communication with the CN 106/115, which may be any type of network configured to provide voice, data, applications, and/or voice over internet protocol (Vol P) services to one or more of the WTRUs 102a, 102b, 102c, 102d. The data may have varying quality of service (QoS) requirements, such as differing throughput requirements, latency requirements, error tolerance requirements, reliability requirements, data throughput requirements, mobility requirements, and the like. The CN 106/115 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104/113 and/or the CN 106/115 may be in direct or indirect communication with other RANs that employ the same RAT as the RAN 104/113 or a different RAT. For example, in addition to being connected to the RAN 104/113, which may be utilizing a NR radio technology, the CN 106/115 may also be in communication with another RAN (not shown) employing a GSM, UMTS, CDMA 2000, WiMAX, E-UTRA, or WiFi radio technology.

The CN 106/115 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104/113 or a different RAT.

Some or all of the WTRUs 102a, 102b, 102c, 102d in the communications system 100 may include multi-mode capabilities (for example, the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

Figure 1B:
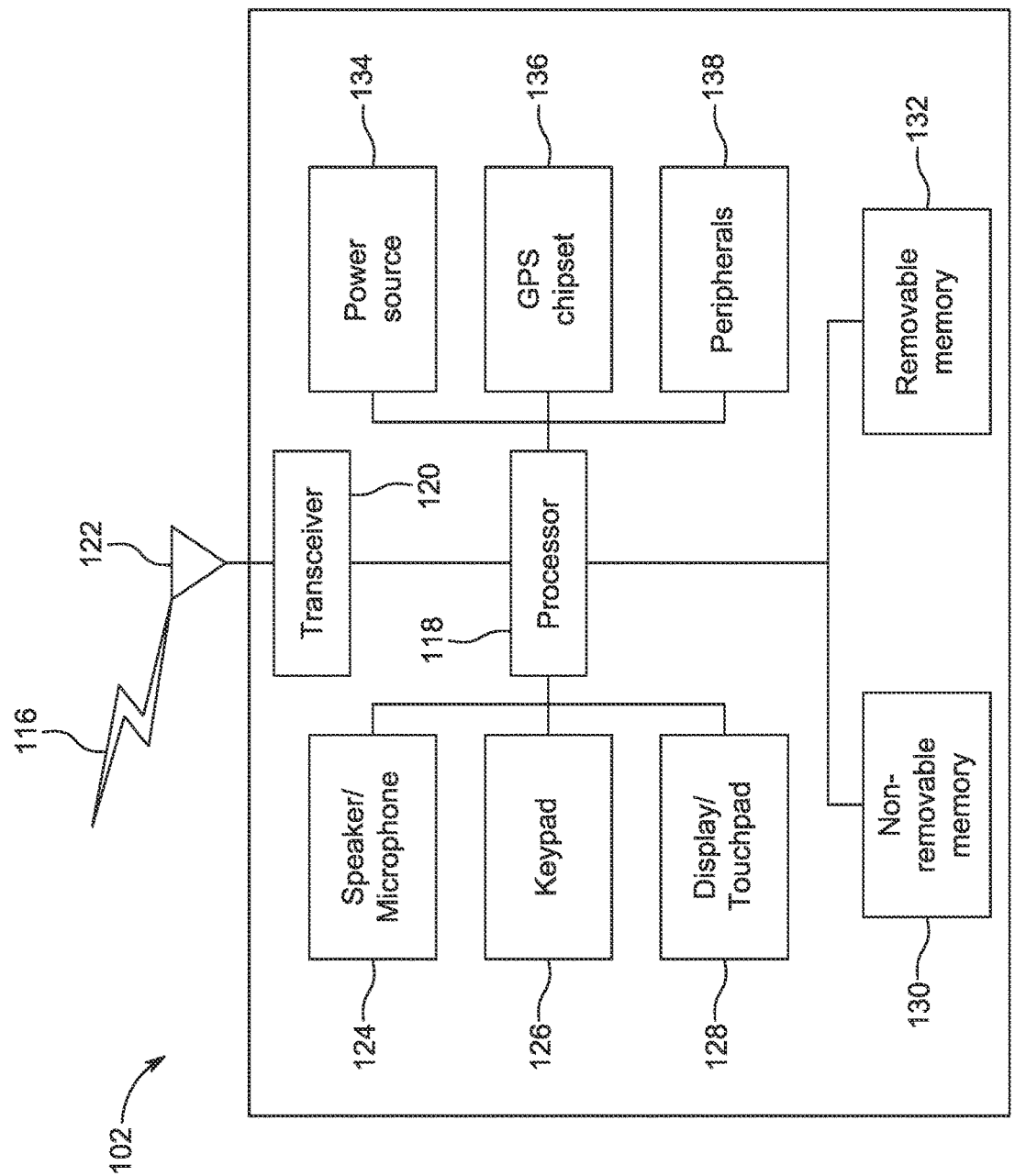
FIG. 1B is a system diagram illustrating an example wireless transmit/receive unit (WTRU) that may be used within the communications system illustrated in FIG. 1A.
Figure 1C:
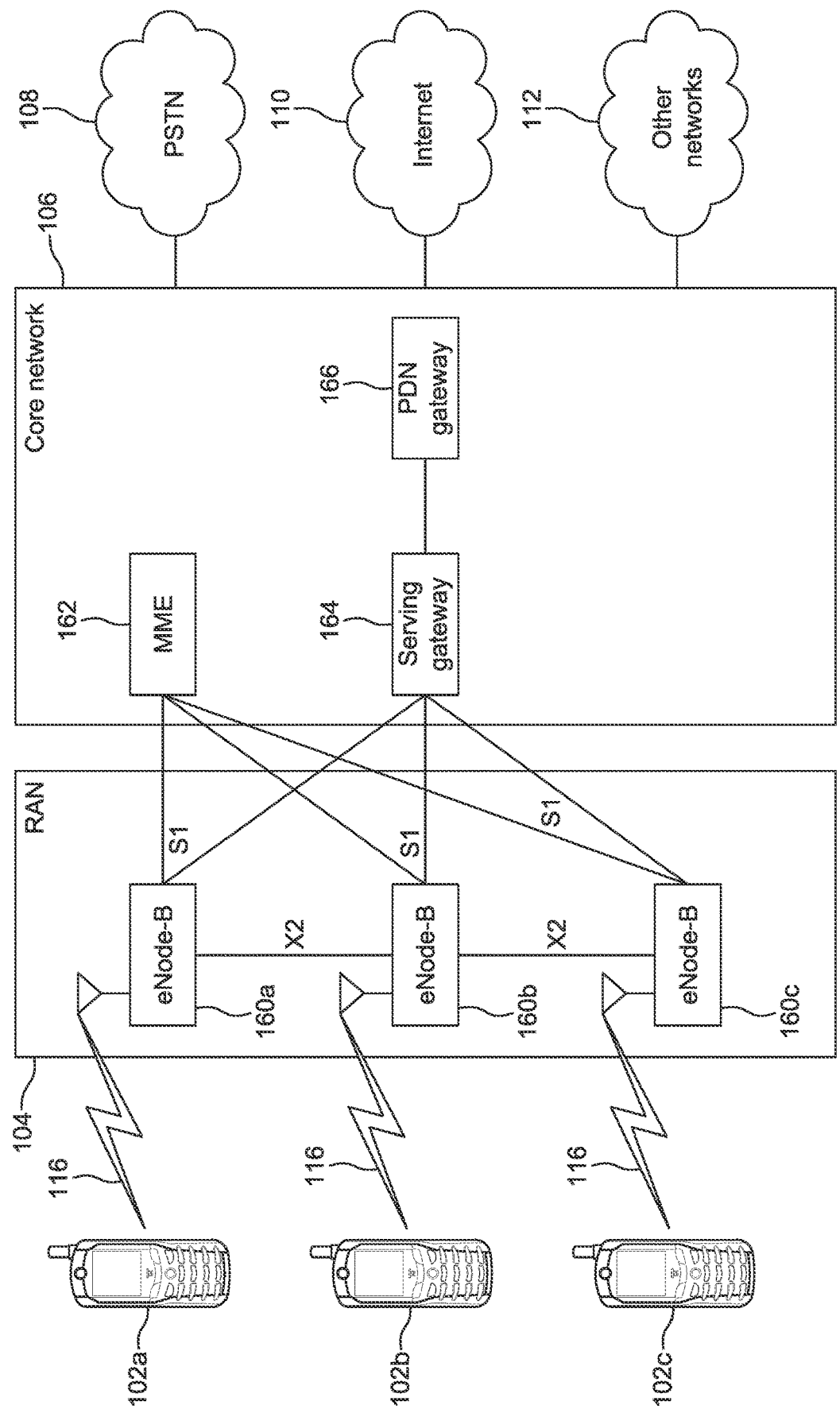
FIG. 1D is a system diagram illustrating a further example RAN and a further example CN that may be used within the communications system illustrated in FIG. 1A.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGA) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (for example, the base station 114a) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (for example, multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (for example, a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (for example, nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (for example, longitude and latitude) regarding the current location of the WTRU 102. In addition to, or in lieu of, the information from the GPS chipset 136, the WTRU 102 may receive location information over the air interface 116 from a base station (for example, base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors. The sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, a humidity sensor and the like.

The WTRU 102 may include a full duplex radio for which transmission and reception of some or all of the signals (for example, associated with particular subframes for both the UL (for example, for transmission) and DL (for example, for reception) may be concurrent and/or simultaneous. The full duplex radio may include an interference management unit to reduce and or substantially eliminate self-interference via either hardware (for example, a choke) or signal processing via a processor (for example, a separate processor (not shown) or via processor 118). In an embodiment, the WTRU 102 may include a half-duplex radio for which transmission and reception of some or all of the signals (for example, associated with particular subframes for either the UL (for example, for transmission) or the DL (for example, for reception)).

Figure 10:
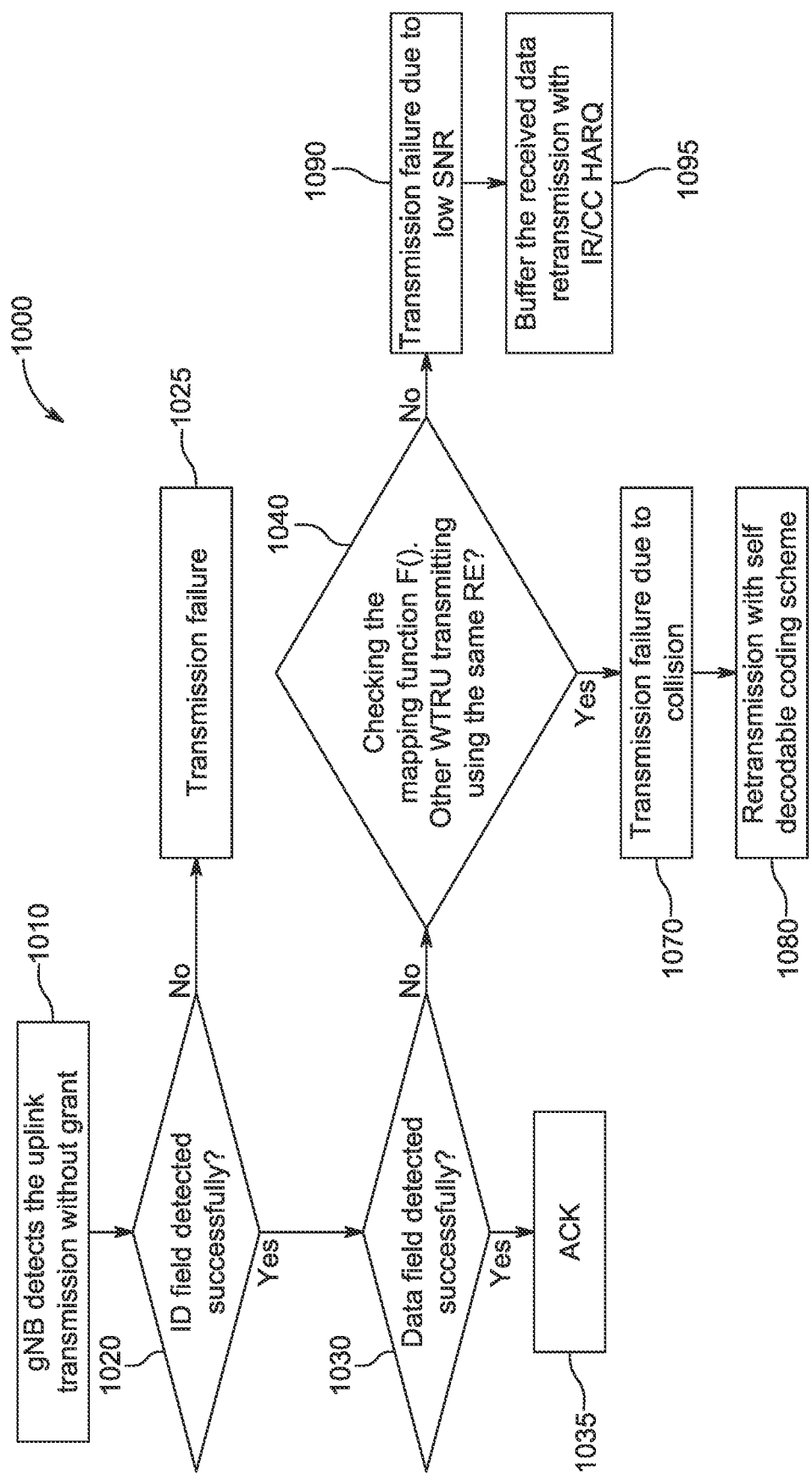
FIG. 10 is a system diagram illustrating an example radio access network (RAN) and an example core network (CN) that may be used within the communications system illustrated in FIG. 1A.

FIG. 10 is a system diagram illustrating the RAN 104 and the CN 106 according to an embodiment. As noted above, the RAN 104 may employ an E-UTRA radio technology to communicate with the WTRUs 102a, 102b, 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and/or receive wireless signals from, the WTRU 102a.

Each of the eNode-Bs 160a, 160b, 160c may be associated with a particular cell (not shown) and may be configured to handle radio resource management decisions, handover decisions, scheduling of users in the UL and/or DL, and the like. As shown in FIG. 10, the eNode-Bs 160a, 160b, 160c may communicate with one another over an X2 interface.

The CN 106 shown in FIG. 10 may include a mobility management entity (MME) 162, a serving gateway (SGW) 164, and a packet data network (PDN) gateway (or PGW) 166. While each of the foregoing elements are depicted as part of the CN 106, it will be appreciated that any of these elements may be owned and/or operated by an entity other than the CN operator.

The MME 162 may be connected to each of the eNode-Bs 162a, 162b, 162c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode-Bs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode-B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (for example, an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (for example, temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more STAs associated with the AP. The AP may have an access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (for example, directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (for example, all of the STAs) within or using the IBSS may communicate directly with each other. The IBSS mode of communication may sometimes be referred to herein as an ad-hoc mode of communication.

When using the 802.11ac infrastructure mode of operation or a similar mode of operations, the AP may transmit a beacon on a fixed channel, such as a primary channel. The primary channel may be a fixed width (for example, 20 megahertz (MHz) wide bandwidth) or a dynamically set width, set via signaling. The primary channel may be the operating channel of the BSS and may be used by the STAs to establish a connection with the AP. In certain representative embodiments, Carrier Sense Multiple Access with Collision Avoidance (CSMA/CA) may be implemented, for example in in 802.11 systems. For CSMA/CA, the STAs (for example, every STA), including the AP, may sense the primary channel. If the primary channel is sensed/detected and/or determined to be busy by a particular STA, the particular STA may back off. One STA (for example, only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 gigahertz (GHz) modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support Meter Type Control/Machine-Type Communications (MTC), such as MTC devices in a macro coverage area. MTC devices may have certain capabilities, for example, limited capabilities including support for (for example, only support for) certain and/or limited bandwidths. The MTC devices may include a battery with a battery life above a threshold (for example, to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (for example, MTC type devices) that support (for example, only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode) transmitting to the AP, the entire available frequency bands may be considered busy even though a majority of the frequency bands remains idle and may be available.

In the United States, the available frequency bands which may be used by 802.11ah are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
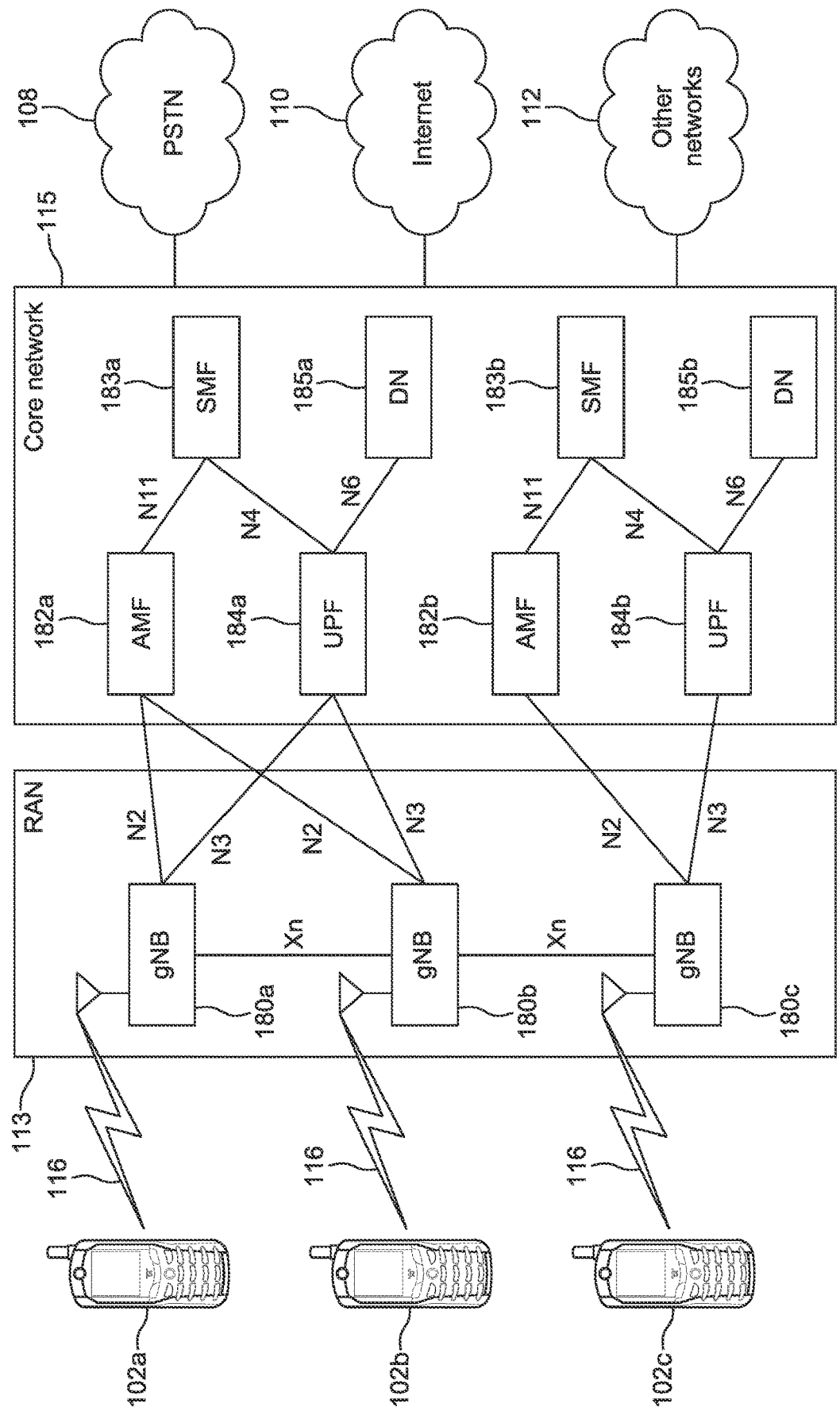

FIG. 1D is a system diagram illustrating the RAN 113 and the CN 115 according to an embodiment. As noted above, the RAN 113 may employ an NR radio technology to communicate with the WTRUs 102a, 102b, 102c over the air interface 116. The RAN 113 may also be in communication with the CN 115.

The RAN 113 may include gNBs 180a, 180b, 180c, though it will be appreciated that the RAN 113 may include any number of gNBs while remaining consistent with an embodiment. The gNBs 180a, 180b, 180c may each include one or more transceivers for communicating with the WTRUs 102a, 102b, 102c over the air interface 116. In one embodiment, the gNBs 180a, 180b, 180c may implement MIMO technology. For example, gNBs 180a, 180b may utilize beamforming to transmit signals to and/or receive signals from the gNBs 180a, 180b, 180c. Also, in an example, gNBs 180a, 180b, 180c may utilize beamforming to transmit signals to and/or receive signals from the WTRUs 102a, 102b, 102c. Thus, the gNB 180a, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a may transmit multiple component carriers (not shown) to the WTRU 102a. A subset of these component carriers may be on unlicensed spectrum while the remaining component carriers may be on licensed spectrum. In an embodiment, the gNBs 180a, 180b, 180c may implement Coordinated Multi-Point (CoMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, the OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths, for example, containing a varying number of OFDM symbols and/or lasting varying lengths of absolute time.

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (for example, such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, dual connectivity, interworking between NR and E-UTRA, routing of user plane data towards User Plane Function (UPF) 184a, 184b, routing of control plane information towards Access and Mobility Management Function (AMF) 182a, 182b and the like. As shown in FIG. 1D, the gNBs 180a, 180b, 180c may communicate with one another over an Xn interface.

The CN 115 shown in FIG. 1D may include at least one AMF 182a, 182b, at least one UPF 184a, 184b, at least one Session Management Function (SMF) 183a, 183b, and possibly a Data Network (DN) 185a, 185b. While each of the foregoing elements are depicted as part of the CN 115, it will be appreciated that any of these elements may be owned and/or operated by an entity other than the CN operator.

The AMF 182a, 182b may be connected to one or more of the gNBs 180a, 180b, 180c in the RAN 113 via an N2 interface and may serve as a control node. For example, the AMF 182a, 182b may be responsible for authenticating users of the WTRUs 102a, 102b, 102c, support for network slicing (for example, handling of different protocol data unit (PDU) sessions with different requirements), selecting a particular SMF 183a, 183b, management of the registration area, termination of non-access stratum (NAS) signaling, mobility management, and the like. Network slicing may be used by the AMF 182a, 182b in order to customize CN support for WTRUs 102a, 102b, 102c based on the types of services being utilized WTRUs 102a, 102b, 102c. For example, different network slices may be established for different use cases such as services relying on ultra-reliable low latency (URLLC) access, services relying on enhanced massive mobile broadband (eMBB) access, services for MTC access, and/or the like. The AMF 182a, 182b may provide a control plane function for switching between the RAN 113 and other RANs (not shown) that employ other radio technologies, such as LTE, LTE-A, LTE-A Pro, and/or non-Third Generation Partnership Project (3GPP) access technologies such as WiFi.

The SMF 183a, 183b may be connected to an AMF 182a, 182b in the CN 115 via an N11 interface. The SMF 183a, 183b may also be connected to a UPF 184a, 184b in the CN 115 via an N4 interface. The SMF 183a, 183b may select and control the UPF 184a, 184b and configure the routing of traffic through the UPF 184a, 184b. The SMF 183a, 183b may perform other functions, such as managing and allocating UE IP address, managing PDU sessions, controlling policy enforcement and QoS, providing DL data notifications, and the like. A PDU session type may be IP-based, non-IP based, Ethernet-based, and the like.

The UPF 184a, 184b may be connected to one or more of the gNBs 180a, 180b, 180c in the RAN 113 via an N3 interface, which may provide the WTRUs 102a, 102b, 102c with access to packet-switched networks, such as the Internet 110, to facilitate communications between the WTRUs 102a, 102b, 102c and IP-enabled devices. The UPF 184, 184b may perform other functions, such as routing and forwarding packets, enforcing user plane policies, supporting multi-homed PDU sessions, handling user plane QoS, buffering DL packets, providing mobility anchoring, and the like.

The CN 115 may facilitate communications with other networks. For example, the CN 115 may include, or may communicate with, an IP gateway (for example, an IP multimedia subsystem (IMS) server) that serves as an interface between the CN 115 and the PSTN 108. In addition, the CN 115 may provide the WTRUs 102a, 102b, 102c with access to the other networks 112, which may include other wired and/or wireless networks that are owned and/or operated by other service providers. In one embodiment, the WTRUs 102a, 102b, 102c may be connected to a local DN 185a, 185b through the UPF 184a, 184b via the N3 interface to the UPF 184a, 184b and an N6 interface between the UPF 184a, 184b and the DN 185a, 185b.

In view of FIGS. 1A-1D, and the corresponding description of FIGS. 1A-1D, one or more, or all, of the functions described herein with regard to one or more of: WTRU 102a-d, Base Station 114a-b, eNode-B 160a-c, MME 162, SGW 164, PGW 166, gNB 180a-c, AMF 182a-ab, UPF 184a-b, SMF 183a-b, DN 185a-b, and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may perform testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (for example, testing) wired and/or wireless communication network in order to implement testing of one or more components. The one or more emulation devices may be test equipment. Direct RF coupling and/or wireless communications via RF circuitry (for example, which may include one or more antennas) may be used by the emulation devices to transmit and/or receive data.

Multiple access (MA) is a scheme in which multiple users (for example, multiple WTRUs) gain access to resources monitored and controlled by a base station and use the resources simultaneously. In example provided herein, a base station may be an eNode-B or a gNB and these terms may be used interchangeably and still be consistent with the examples provided herein. For example, OFDMA uses several carriers carrying data independently of each other and not interfering with each other.

Figure 2:
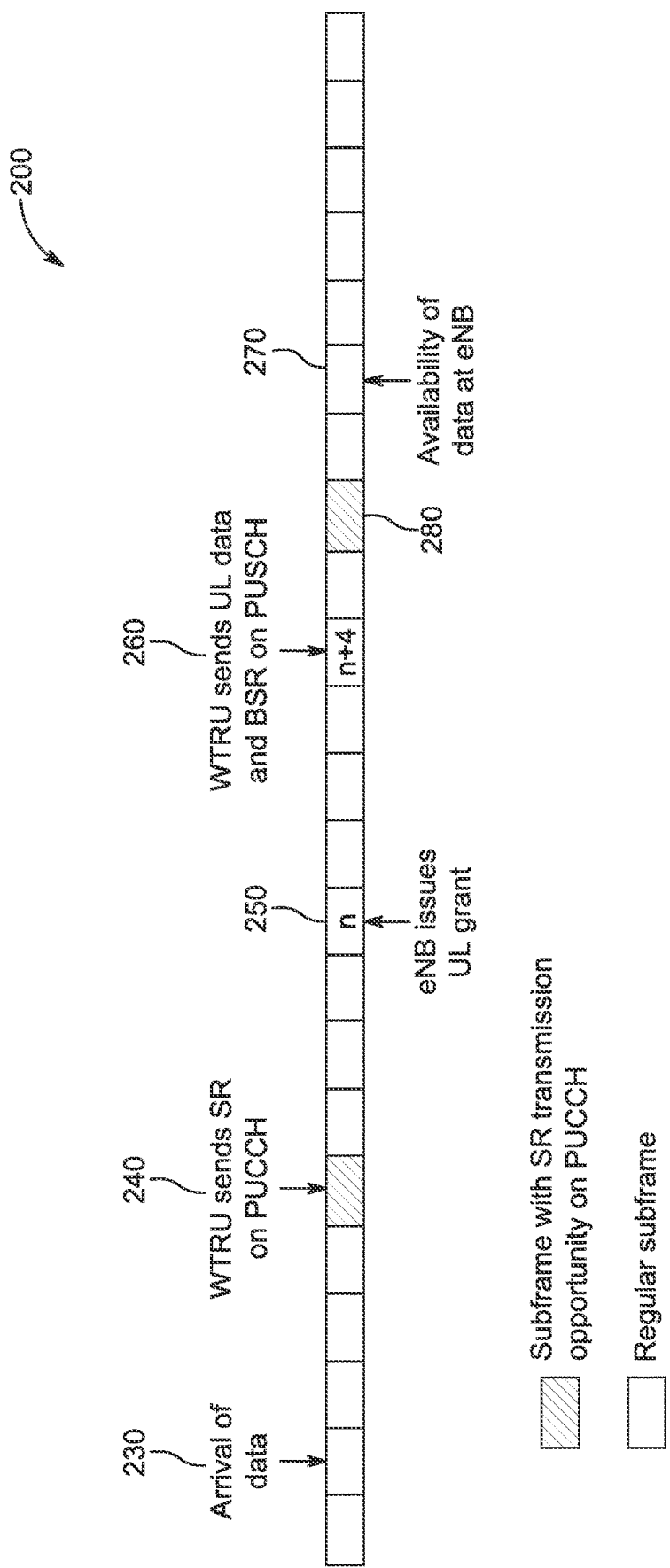
FIG. 2 is a timing diagram illustrating an example scheduling request (SR) process in Long Term Evolution (LTE)

In LTE, uplink access may be enabled by a contention-free or grant-based procedure as shown in FIG. 2. Any UE referenced in FIGS. 2-12 may be interchangeable with a WTRU and still be consistent with the examples provided herein. WTRUs may be configured to use a specific Physical Uplink Control Channel/Physical Uplink Shared Channel (PUCCH/PUSCH) resource(s) to initiate the access process. In an example case where there is an absence of a scheduled Scheduling Request (SR) resource(s), a WTRU may kick start the access process through a Random Access Channel (RACH) procedure.

FIG. 2 is a timing diagram illustrating an example SR process in LTE. As shown in an example in timing diagram 200, a procedure for contention-free uplink access in LTE may assume an SR interval of 10 milliseconds (ms). The SR process for a contention-free uplink access can be summarized in the following main operations. A WTRU may notice the arrival of uplink data at the uplink buffer of the WTRU 230. The WTRU may then await for a subframe with an SR transmission opportunity (1-9 ms), and send the SR using dedicated resources on an uplink control channel (for example, PUCCH) during the SR transmission opportunity

240. SR transmission opportunity 240 is earlier in time than SR transmission opportunity 280 and may be the first available SR transmission opportunity after the arrival of uplink data at the uplink buffer of the WTRU 230. Upon reception of the SR, an eNode-B issues the WTRU an uplink grant for a PUSCH transmission 250, which may be issued during a regular subframe. After receiving the grant, the WTRU may send the uplink data 260 on a PUSCH. If required, the WTRU may also send its buffer status report (BSR) in the same subframe 260. According to the received BSR, the eNode-B may schedule resources for a further PUSCH transmission. In a later time, the transmitted uplink data by the WTRU may be received by and be available at eNode-B 270.

As outlined, the SR process requires coordination and control between the WTRU and eNode-B. Assuming success of the initial SR transmission on the PUCCH, the completion of the SR process may take about 20 ms before the actual PUSCH transmission.

As discussed herein, an uplink data transmission with an uplink grant (for example, downlink control information (DCI) for scheduling) may be referred to as a DCI message, a grant-based PUSCH transmission (GB-PUSCH), or both. Further, an uplink data transmission without an uplink grant may be referred to as grant-less (GL) PUSCH (GL-PUSCH) transmission. The terms 'grant-less' and 'grant-free' may be used interchangeably as discussed herein. A PUSCH transmission may be interchangeably used with an uplink transmission, an uplink data transmission, and/or an uplink control information transmission.

The following are examples of procedures relating to GB transmission and GL transmission: Contention-based SR transmission for MA; Independent transmission of SR and GL-PUSCH; Grant-less Uplink Transmission and hybrid automatic repeat request (HARQ) Design; Beam selection consideration; Format of Grant-less UL transmissions; Grant-less Access Resource Provisioning; Resource sharing between Grant-less and Grant-based UL transmissions; Grant-less transmission acknowledgement; and/or Grant-less transmission power control. As discussed herein, a frame format may include the idea that control information is transmitted before data. As used herein, data may also be referred to as payload data, user data or both and still be consistent with the examples provided.

With GL transmission, an eNode-B may not be able to distinguish the transmitting WTRU if the eNode-B fails to decode the packet transmitted through the GL transmission, which may contain a WTRU identity (WTRU ID). Moreover, the eNode-B may not be able to determine whether the transmission failure is due to collision or instead due to low Signal-to-Noise Ratio (SNR). Thus, the eNode-B may not be able to use the failed transmission for HARQ even if it may be usable.

As used in examples herein, the WTRU ID may be one or more of an international mobile subscriber identity (IMSI), a temporary mobile subscriber identity (TMSI), a radio network temporary identifier (RNTI), an enhanced RNTI (eRNTI), and the like. Further, the WTRU ID may be expressed in binary form, in digital form, as a hash function, as a range of numbers, and the like.

To address issues related to GL transmissions, one or more embodiments relating to a double contention pool based method may considered. Also, one or more embodiments relating to acknowledgement and retransmission may be considered.

Several examples may use a double contention pool based method. A contention resource pool may contain resource blocks which may be used for GL transmission. A contention resource pool may have two sub-pools: an ID/control pool which may contain resource blocks (RBs) that may be used by WTRUs to transmit ID/control related information; and a data pool which may contain RBs that may be used by WTRUs to transmit uplink data.

As used in examples herein, RBs may refer to one or more time resource and one or more frequency resources. In examples, the time resources may one or more of various length symbols, TTIs and subframes, and the frequency resources may be one or more of various length subcarriers, carriers and bandwidths. RBs may be include contiguous or non-contiguous resources. RBs may be included in sets of RBs, subsets of RBs or both. RBs may be grouped into one or more RB groups (RBGs).

RBs may contain one or more resource elements (REs). As used in examples herein, REs may refer to one or more fundamental time resource and one or more fundamental frequency resources. In examples, the RBs in an ID/control pool may not contain the same number of REs as in a data pool. In other examples, the RBs in an ID/control pool may contain the same number of REs as in a data pool.

The size of the ID/control pool may be bigger than or equal to that of the data pool, so that the collision probability in ID/control pool may be less than that in data pool. Thus, ID/control information may be better protected than the data information.

The transmissions in the ID/control pool may use basic modulation and coding schemes with a basic number of spatial streams. For example, the transmission may use the lowest modulation and coding scheme with single spatial stream. The modulation coding levels and number of spatial streams used in the ID/control pool may be pre-defined, pre-determined or both.

A WTRU may choose one RB from the ID/control pool to transmit its WTRU ID and corresponding control information. The WTRU may choose zero or one or more RBs from the data pool to transmit its uplink data. If the WTRU may choose one RB from the ID/control pool and zero RBs from the data pool, for example, the WTRU may transmit ID/control information only, then the transmission may be considered as an SR. This may be used for a transmission scheme where a GL transmission is followed by a GB transmission. In one method, the WTRU may indicate an SR in an ID/control RB explicitly. For example, one bit may be set to indicate an SR and no UL GL data transmission would follow.

ID/control pool and data pool may be partitioned by time division, frequency division, code division, spatial division, or some combination of the divisions described herein. In a time division partition, RBs located in a certain time period may be allocated for an ID/control pool and RBs located in a non-overlapping time period may be allocated for a data pool. In a frequency division partition, RBs located in certain frequency resources may be allocated for an ID/control pool and RBs located in a non-overlapping frequency resources may be allocated for a data pool. In code division partition, a set of orthogonal codes with good cross-correlation properties may be pre-defined and/or pre-determined for code division transmission. Further, a subset of the codes may be selected and allocated for an ID/control pool and another subset of the codes may be selected and allocated for a data pool. Also, the two subsets of code division may or may not be overlapped. In a spatial division partition, some spatial vectors/beams may be assigned to carry ID/control information and the rest may be assigned to carry Data information. In a combination of partitions, the one or more pools may or may not be overlapping in at least one dimension.

An ID/control pool and a data pool may have an independent or dependent relationship of RB sections. For an independent relationship, the WTRU may select ID/control RB(s) from ID/control pool(s) and data RB(s) from data pool(s) independently. For example, the WTRU may signal/indicate the data RB location in the ID/control RB, thus, there may not be a WTRU ID included in the data transmission.

For a dependent relationship, the WTRU may select ID/control RB(s), data RB(s) or both in a random way. Further, the selection of corresponding data RB(s), ID/control RB(s) or both may be determined in a pre-defined or pre-determined way. For example, the WTRU may use a ID/control RB index to data RB index mapping. Moreover, the transmission of ID/control information on the ID/control RB(s) may contain an explicit indication of a timing offset. For example, a timing offset compared to the start or the end of the ID/control transmission, and/or resource(s) used to transmit the data.

Example access procedures for GL transmission are discussed herein. In examples discussed herein, a double contention pool based method may allow the use of different WTRU procedures depending on the double contention pool setting. One example includes a WTRU ID/control pool based random access procedure.

Figure 3:
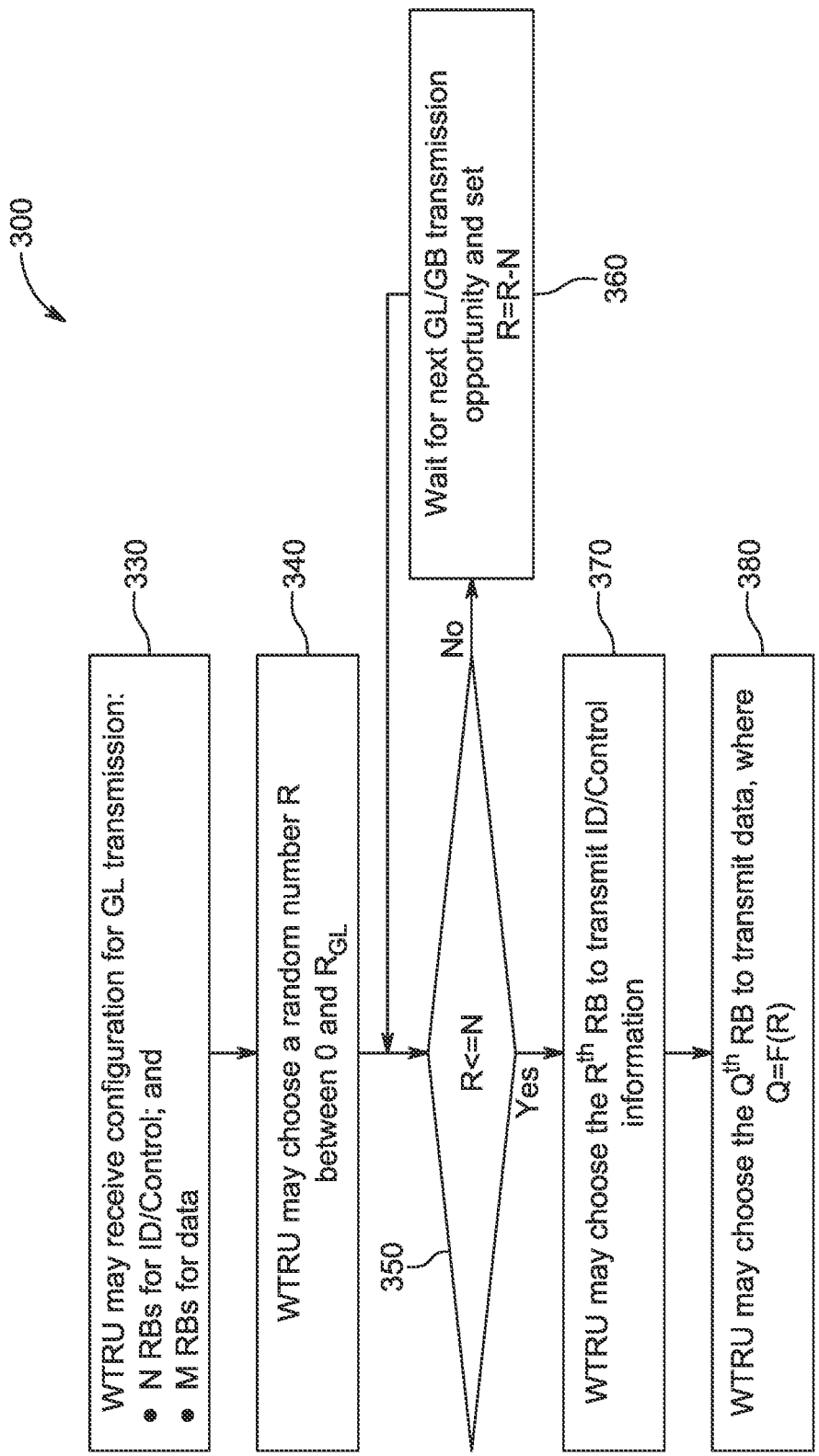
FIG. 3 is a flow diagram illustrating an example of a WTRU identity (ID)/control pool based random access procedure.

FIG. 3 is a flow diagram illustrating an example of a WTRU ID/control pool based random access procedure. In an example shown in flow diagram 300, a WTRU may receive a downlink transmission with a configuration for GL transmission with N RB(s) utilized as an ID/control pool(s) and M RB(s) as a data pool(s) 330. The data pool may be for payload data or user data. When the WTRU intends to transmit in the GL transmission opportunity, and/or the WTRU satisfies any restriction pre-defined or announced by the base station for the GL transmission, if any, the WTRU may choose a random number R, where $R \in [0, R_{GL}]$ 340. In examples, the base station may be an eNode-B or a gNB. $R_{GL}$ may be a number pre-defined and/or pre-determined. $R_{GL}$ may be a number chosen from a given range $[R_{min}, R_{max}]$, where $R_{min}$ and $R_{max}$ may be pre-defined and/or pre-determined and signaled. In one example, $R_{GL}$ may be pre-determined by the base station and signaled in a downlink transmission. For example, $R_{GL}$ may be set to N, thus all the intended WTRUs may compete in a current GL transmission opportunity and reduce transmission latency. In another example, $R_{GL}$ may be determined based on random access protocol and collision conditions. For example, $R_{GL}$ may be set to $R_{min}$ as an initial value and it may be set to a minimum value of $2R_{GL}$ and $R_{max}$ if the GL transmission failed. After a successful transmission, $R_{GL}$ may be reset to $R_{min}$.

The WTRU may then determine whether R is less than or equal to N 350. On a condition that R is less than or equal to N, the WTRU may transmit in the GL transmission opportunity. For example, the WTRU may choose the $R^{th}$ RB in the ID/control pool to transmit ID/control information 370. In another example, the WTRU may choose a random number $R_{ID}$ between 1 and N, and use the $R_{ID}^{th}$ RB to transmit ID/control information. In several examples, the ID/control information may include a WTRU ID or UE ID.

In a further example, the WTRU may choose the $Q^{th}$ RB to transmit data, such as payload data or user data, where Q=F(R) 380. F( ) may be a pre-defined and/or a pre-determined function, which maps integers from 1 to N to integers from 1 to M. In another example, the WTRU may choose the $Q_{ID}^{th}$ RB to transmit data, where $Q_{ID}=F(R_{ID})$. In any event, $R_{ID}$ may be the resource index at which the WTRU transmits its ID/control information. In addition, the WTRU may transmit its data at the time offset or slot number $T_d=F_t(R_{ID}, T_{ID})$ where $F_t(R_{ID}, T_{ID})$ may be a function of $R_{ID}$ and $T_{ID}$, which are the resource and time offset/slot number, respectively, at which the WTRU transmits its ID/control information.

On a condition that R is greater than N 350, the WTRU may not transmit in the GL, and may wait for another GL/GB transmission opportunity 360. The WTRU may also set R=R−N in the new GL.

In other examples, a double contention pool based method may provide different WTRU procedures, depending on the double contention pool setting, for GL transmission. For example, a data pool based random access procedure may be used by a WTRU.

Figure 4:
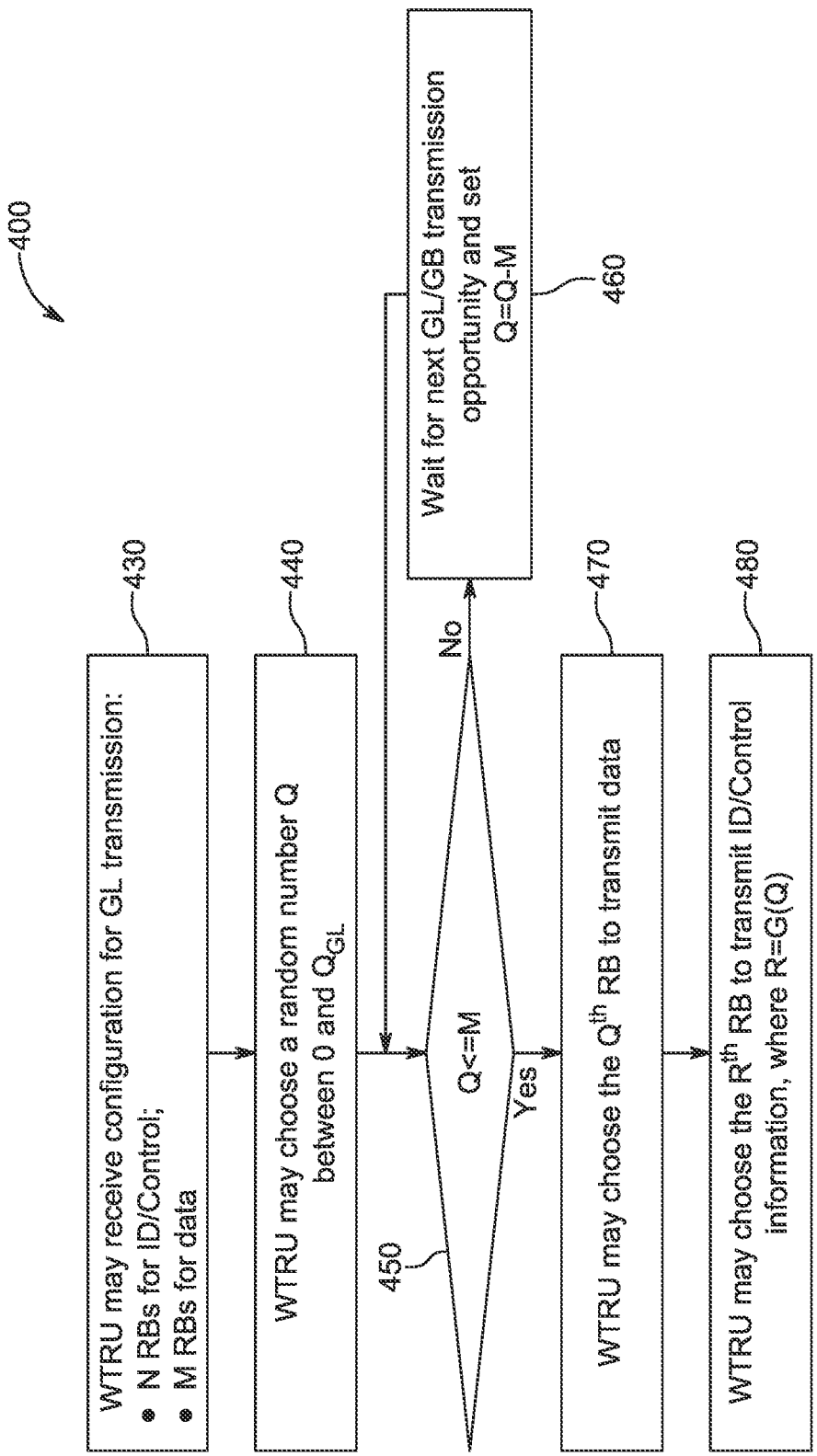
FIG. 4 is a flow diagram illustrating an example of a data pool based random access procedure.

FIG. 4 is a flow diagram illustrating an example of a data pool based random access procedure. In an example shown in flow diagram 400, a WTRU may receive a downlink transmission with a configuration for GL transmission with N RBs utilized as WTRU ID/control pool(s) and M RBs as data pool(s) 430. When the WTRU intends to transmit in the GL transmission opportunity, and/or the WTRU satisfies any restriction pre-defined or announced by the base station for the GL transmission if any, the WTRU may choose a random number Q, where $Q \in [0, Q_{GL}]$ 440. $R_{GL}$ may be a number pre-defined and/or pre-determined. In examples, the base station may be an eNode-B or a gNB. $R_{GL}$ may be a number chosen from a given range $[Q_{min}, Q_{max}]$, where $Q_{min}$ and $Q_{max}$ may be pre-defined and/or pre-determined and signaled. In one example, $Q_{GL}$ may be pre-determined by the base station and signaled in a downlink transmission. For example, $Q_{GL}$ may be set to M, thus all the intended WTRUs may compete in the current GL transmission opportunity and reduce transmission latency. In another example, $Q_{GL}$ may be determined based on random access protocol and collision conditions. For example, $Q_{GL}$ may be set to $Q_{min}$ as initial value and it may be set to minimum value of $2Q_{GL}$ and $Q_{max}$ if the GL transmission failed. After a successful transmission, $Q_{GL}$ may be reset to $Q_{min}$.

The WTRU may then determine whether Q is less than or equal to M 450. On a condition that Q is less than or equal to M, the WTRU may transmit in the GL. For example, the WTRU may choose $Q^{th}$ RB in the data pool to transmit uplink data 470. In a further example, the WTRU may choose a random number $Q_{ID}$ between 1 and M, and use the $Q_{ID}^{th}$ RB to transmit uplink data. Further, the WTRU may choose the $R^{th}$ RB to transmit WTRU ID/control information, where R=G(Q) 480. G( ) may be a pre-defined and/or pre-determined function that maps integers from 1 to M to integers from 1 to N. In a further example, the WTRU may choose the $R_{ID}^{th}$ RB to transmit WTRU ID/control information, where $R_{ID}=G(Q_{ID})$.

On a condition Q is greater than M, the WTRU may not transmit in the GL, and may wait for another GL/GB transmission opportunity 460. The WTRU may also set Q=Q−M in the new GL.

In another example, a double contention pool based method may allow different WTRU procedures depending on the double contention pool setting, such as an ID/control pool based random access procedure with mixed GL and GB transmission. In an example of such a procedure, the first UL transmission may be assumed to be a GL transmission, while the retransmission may be a GL transmission or a GB transmission.

Figure 5:
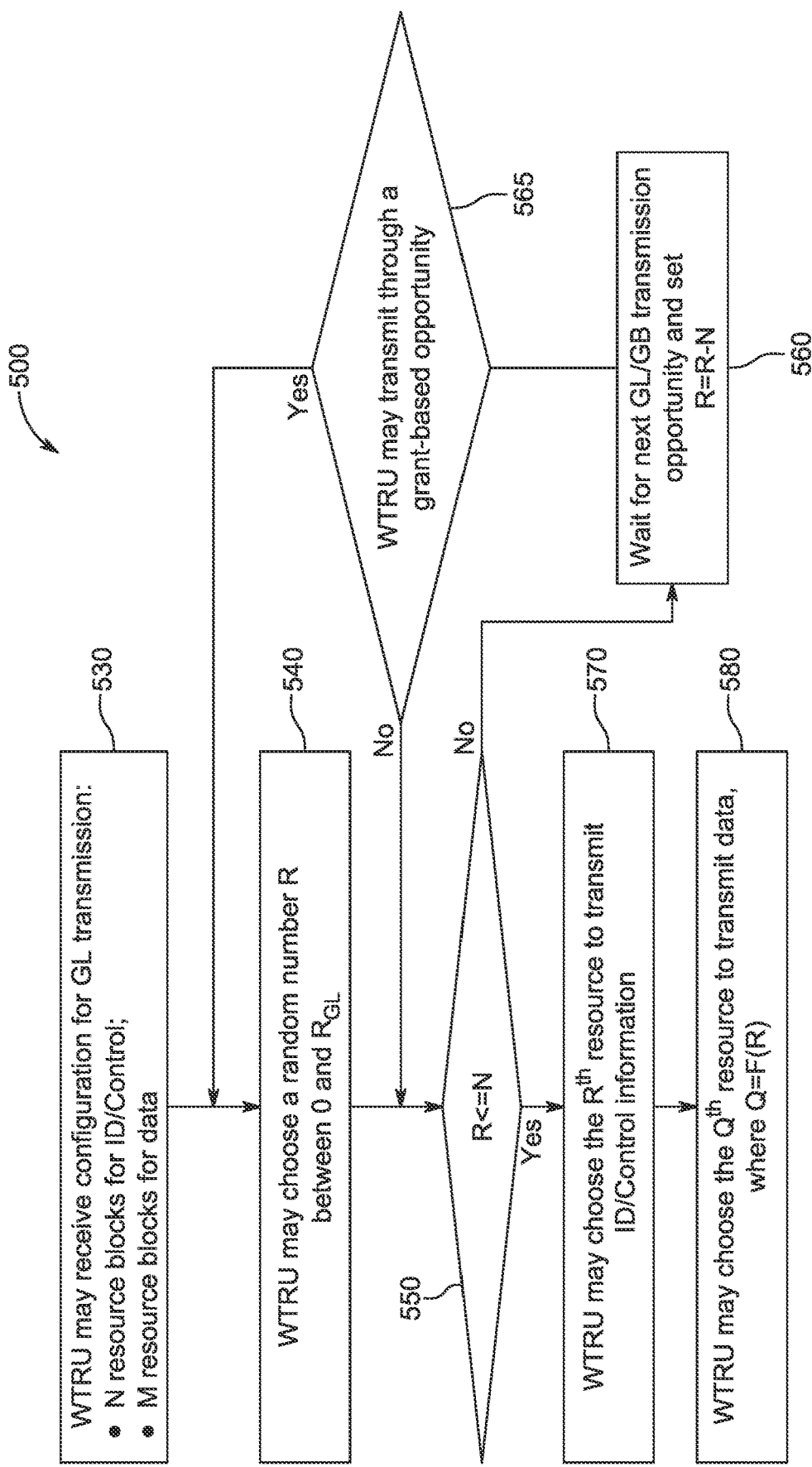
FIG. 5 is a flow diagram illustrating an example of an ID/Control pool based random access procedure with mixed grant-less (GL) and grant-based (GB) transmission.

FIG. 5 is a flow diagram illustrating an example of an ID/Control pool based random access procedure with mixed GL and GB transmission. In an example shown in flow diagram 500, a WTRU may receive a downlink transmission with a configuration for GL transmission with N RBs utilized as ID/control pool(s) and M RBs as data pool 530. When the WTRU intends to transmit in the GL transmission opportunity, and/or it satisfies any restriction pre-defined or announced by the base station for the GL transmission, if any, the WTRU may choose a random number R, where $R \in [0, R_{GL}]$ 540. In examples, the base station may be an eNode-B or a gNB. $R_{GL}$ may be a number pre-defined and/or pre-determined. $R_{GL}$ may be a number chosen from a given range $[R_{min}, R_{max}]$, where $R_{min}$ and $R_{max}$ may be pre-defined and/or pre-determined and signaled. In one example, $R_{GL}$ may be pre-determined by the base station and signaled in a downlink transmission. For example, $R_{GL}$ may be set to N, thus all the intended WTRUs may compete in the current GL transmission opportunity and reduce transmission latency. In another example, $R_{GL}$ may be determined based on random access protocol and collision conditions. For example, $R_{GL}$ may be set to $R_{min}$ as an initial value and it may be set to minimum value of $2R_{GL}$ and $R_{max}$ if the GL transmission failed. After a successful transmission, $R_{GL}$ may be reset to $R_{min}$.

The WTRU may then determine whether R is less than or equal to N 550. On a condition that R is less than or equal to N, the WTRU may transmit in the GL. In a related example, the WTRU may choose $R^{th}$ RB in the WTRU ID/control pool to transmit WTRU ID/control information 570. In a further example, the WTRU may choose a random number $R_{ID}$ between 1 and N, and use the $R_{ID}^{th}$ RB to transmit ID/control information. In any event, the ID/control information may include the WTRU ID. Further, the WTRU may choose the $Q^{th}$ RB to transmit data, where Q=F(R) 580. F( ) may be a pre-defined and/or pre-determined function that maps integers from 1 to N to integers from 1 to M. In a further example, the WTRU may choose the Qom RB to transmit data, where $Q_{ID}$=F($R_{ID}$).

On a condition that R is greater than N, the WTRU may not transmit in the GL, and may wait for the next transmission opportunity 560, which may be a GL transmission opportunity or a GB transmission opportunity. The WTRU may also set R=R−N. In an example, when the next transmission opportunity is GB, the WTRU may transmit the scheduled data 565. For example, the WTRU may discard R, thus, a new random number may need to be drawn within the range (0, $R_{GL}$] for next GL transmission. $R_{GL}$ may be reset to $R_{min}$ or pre-determined by an base station. In another example, the WTRU may save R and use it for next potential GL transmission. Also, when the next transmission opportunity is a GL transmission opportunity, the WTRU may continue to use the updated R value and compare it with N.

The examples discussed herein with regard to the ID/control pool based random access procedure with mixed GL and GB transmission of FIG. 5, and the related description, may be extended to a data pool procedure. For example, an ID/control pool based procedure example may be extended to a data pool based procedure example by replacing R with Q and replacing N with M.

In other examples, a double contention pool based method may allow different WTRU procedures depending on the double contention pool setting, such as an ID/control pool based random access procedure for high priority users. In such examples, users may have critical requirements for latency and reliability, such as URLLC users. In such cases, the user may be allowed multiple transmission chances in one or more of the GL transmission opportunities to further reduce the probability of collision. For example, the user may be allowed to use two ID/control RBs and one or two Data RBs.

Figure 6:
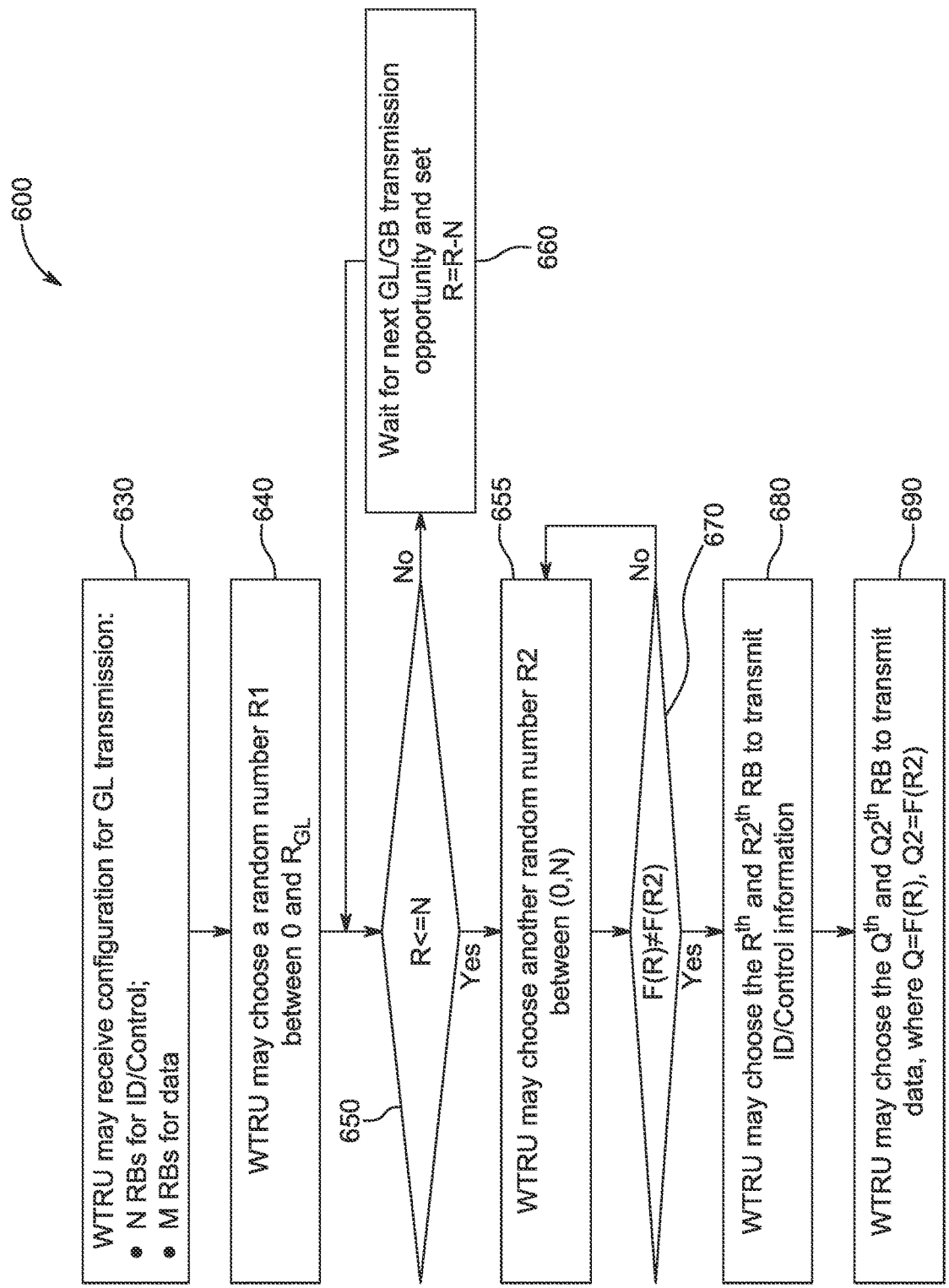
FIG. 6 is a flow diagram illustrating an example of an ID/control pool based random access procedure for high priority users.

FIG. 6 is a flow diagram illustrating an example of an ID/control pool based random access procedure for high priority users. In an example shown in flow diagram 600, a WTRU may receive a downlink transmission with a configuration for GL transmission with N RBs utilized as WTRU ID/control pool(s) and M RBs as data pool(s) 630. In an example, the WTRU may be a WTRU with critical requirements for latency and reliability. For example, the WTRU may be a URLLC WTRU. The configuration may indicate allowing two transmission opportunities for a certain class of user, for example, WTRUs with critical requirements for latency and reliability. In an example, the class of users may be URLLC WTRUs. In a further example, the multiple transmission rule for GL may be pre-determined/pre-defined or signaled in an additional manner or an alternative manner. When the WTRU intends to transmit in the GL transmission opportunity, and/or it may satisfy any restriction pre-defined or announced by the base station for the GL transmission, if any, the WTRU may choose a random number R, where $R \in [0, R_{GL}]$ 640. In examples, the base station may be an eNode-B or a gNB. $R_{GL}$ may be a number pre-defined and/or pre-determined. $R_{GL}$ may be a number chosen from a given range $[R_{min}, R_{max}]$, where $R_{min}$ and $R_{max}$ may be pre-defined and/or pre-determined and signaled. In one example, $R_{GL}$ may be pre-determined by the base station and signaled in a downlink transmission. For example, $R_{GL}$ may be set to N, thus all the intended WTRUs may compete in the current GL transmission opportunity and reduce transmission latency. In another example, $R_{GL}$ may be determined based on random access protocol and collision conditions. For example, $R_{GL}$ may be set to $R_{min}$ as an initial value and it may be set to a minimum value of $2R_{GL}$ and $R_{max}$ if the GL transmission failed, After a successful transmission, $R_{GL}$ may be reset to $R_{min}$.

The WTRU may then determine whether R is less than or equal to N 650. On a condition that R is less than or equal to N, the WTRU may choose a second random integer number R2 in the range of (0, N) 655. The WTRU may then determine whether F(R)=F(R2) 670. If F(R)=F(R2), then the WTRU may draw another random integer as R2 655. If F(R)≠F(R2) then the WTRU may perform a random access procedure.

For ID/control information transmission, the WTRU may choose the $R^{th}$ RB in the ID/control pool to transmit ID/control information 680. In a further example, the WTRU may choose a random number $R_{ID}$ between 1 and N, and use the $R_{ID}^{th}$ RB to transmit ID/control information. In any event, the ID/control information may include a WTRU ID. Also, the WTRU may choose the $R2^{th}$ RB in the ID/control pool to transmit ID/control information. The information transmitted in both RBs may be duplicated. Also, the transmission on the second RB may be modified slightly. For example, the transmission may be phase rotated, or interleaved at a bit level or a symbol level. In another example, the WTRU may code and modulate the ID/control information with a given or lower rate and transmit it on two RBs. In another example, dual carrier modulation may be utilized. For example, a set of coded bits may be mapped to two modulated symbols using different constellation mapping and transmitted on the two RBs.

For data transmissions the WTRU may choose the $Q^{th}$ RB to transmit data, where Q=F(R) 690 and F( ) is a pre-defined and/or pre-determined function, which maps integers from 1 to N to integers from 1 to M. In a further example, the WTRU may choose the $Q_{ID}^{th}$ RB to transmit data, where $Q_{ID}=F(R_{ID})$. Also, the WTRU may choose the $Q2^{th}$ RB to transmit data, where Q2=F2(R). The information transmitted in both RBs may be duplicated. The transmission on the second RB may be modified slightly: for example, it may be phase rotated, or interleaved in bit level or symbol level. In a further example, the WTRU may code and modulate the data information with a given rate and transmit it on two RBs. In another example, dual carrier modulation may be utilized. For example, a set of coded bits may be mapped to two modulated symbols using different constellation mapping and transmitted on the two RBs.

On a condition that R is greater than N 650, the WTRU may not transmit in the GL, and may wait for another GL 660. The WTRU may set R=R−N in the new GL. The examples discussed herein with regard to the ID/control pool based random access procedure for high priority users of FIG. 6, and the related description, may be extended to a data pool procedure.

In another example, a double contention pool based method may allow different WTRU procedures depending on the double contention pool setting, such as an ID/control pool based random access procedure for mixed priority users. In one such example, WTRUs (or traffic types) with different priorities may compete and transmit in a GL transmission opportunity. For example, the priority may be pre-set by the operator or depend on the type of the devices. The priority may be associated with users or types of traffic. For example, some WTRUs may require high reliability and low latency; while other WTRUs may require high data rate(s). In another example, the type of traffic such as URLLC, eMBB and mMTC may have different requirements. Further, in examples, different types of traffic may have different priorities.

Figure 7:
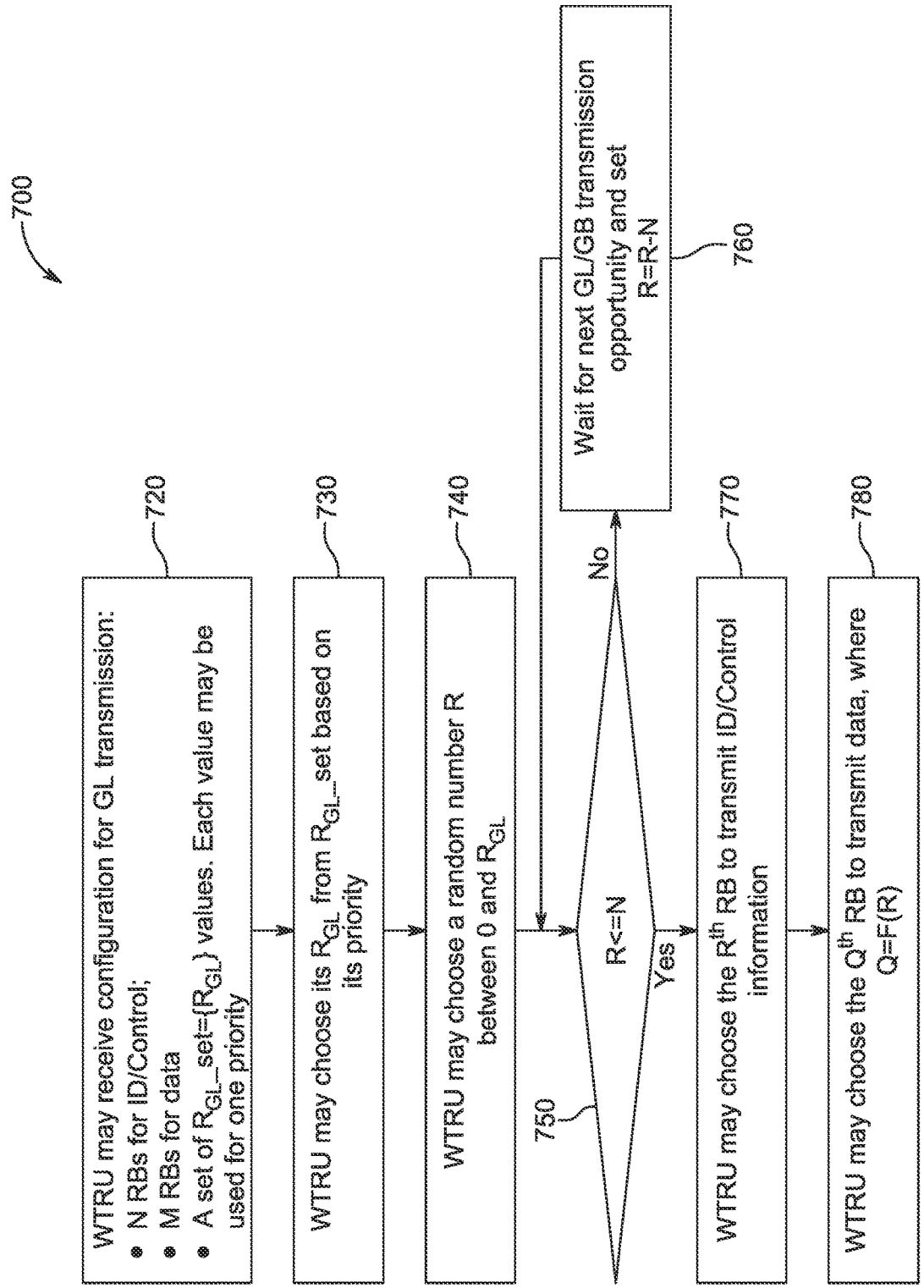
FIG. 7 is a flow diagram illustrating an example of an ID/control pool based random access procedure for mixed priority users.

FIG. 7 is a flow diagram illustrating an example of an ID/control pool based random access procedure for mixed priority users. In an examples shown in flow diagram 700, a WTRU may receive a downlink transmission with a configuration for GL transmission with N RBs utilized as ID/control pool(s) and M RBs as data pool(s) 720. The WTRU may also receive a set of $R_{GL}$ values, $R_{GL\_set}=\{R_{GL}^{i}\}$, where i=1, . . . , I. I may be the total number of priorities supported. For higher priority, the $R_{GL}$ value may be smaller. In a further example, the $R_{GL\_set}$ may be predefined and known by the base station(s), WTRUs or both. In examples, the base station may be an eNode-B or a gNB. In the case that the WTRU may intend to transmit in the GL transmission opportunity, and/or that it may satisfy any restriction pre-defined or announced by the base station for the GL transmission if any, the WTRU may determine its $R_{GL}$ based on its priority 730. In any event, the WTRU may choose a random number R, where R∈[0,R_GL]. Accordingly, the WTRU may choose its $R_{GL}$ from the $R_{GL}$ set.

The WTRU may determine whether R is less than or equal to N 750. On a condition that R is less than or equal to N, the WTRU may transmit in the GL. The WTRU may choose $R^{th}$ RB in the ID/control pool to transmit ID/control information 770. In another example, the WTRU may choose a random number $R_{ID}$ between 1 and N, and use the $R_{ID}^{th}$ RB to transmit ID/control information. In any event, the ID/control information may include the WTRU ID. The WTRU may choose the $Q^{th}$ RB to transmit data, where Q=F(R) 780. F( ) may be a pre-defined and/or pre-determined function, which maps integers from 1 to N to integers from 1 to M. In another example, the WTRU may choose the $Q_{ID}^{th}$ RB to transmit data, where $Q_{ID}=F(R_{ID})$.

On a condition R is greater than N 750, the WTRU may not transmit in the GL, and may wait for another GL/GB transmission opportunity 760. The WTRU may also set R=R−N in the new GL.

The examples discussed herein with regard to the ID/control pool based random access procedure with priority and mixed priority users of FIGS. 6 and 7, and the related description, may be extended to data pool examples. In a further example, example procedures in FIGS. 6 and 7, and the related description, may be combined. For example, WTRUs with a high priority may follow methods described herein and determine the $R_{GL}$ and complete a transmission as was described with relation to examples methods for mixed priority users, mixed GL transmission and GB transmission, or any combination of these examples. Further, while WTRUs are recited in the figures, and related description, in further examples the WTRU may be replaced with a type of traffic. For example, types of traffic may include URLLC traffic, eMBB traffic, mMTC traffic, or any combination of these traffic types, which may use different $R_{GL}$ values.

In examples, a double contention pool based method may allow for different WTRU functions, such as mapping function(s) F( ) and/or G( ) which may be pre-defined or pre-determined. In one example, a ratio may be defined as $$K = \frac{N}{M}$$

where N may be the RB(s) tor ID/control information and M may be the RB(s) for data. In an example function F(.), integers from 1 to N may be mapped to integers from 1 to M. F( ) may be defined as follows:

$$F(x) = \begin{cases} 1 & x = 1 \\ \text{round}\left(\frac{x}{K}\right) & 1 < x < M, \\ M & x = M \end{cases} \quad \text{Equation (1)}$$

In an example, the function round(x) may be the closest integer to number x. Further, function G(.), which may map integers from 1 to M to integers from 1 to N, may be defined as follows:

$$G(x) = \text{round}\left(x * K - \frac{K}{2}\right) + rand(\text{round}(K)). \quad \text{Equation (2)}$$

If G(x)<1, then one may set G(x)=1. If G(x)>N, one may set G(x)=N. The function round(x) may be the closest integer to number x, in an example. Additionally, the function rand(x) may be a random number drawn from 1 to x.

The equations used in the examples above may vary mathematically in other situations but the basic ideas may remain similar. For example, to design/define F( ), which may map a larger set of the integers to a smaller set of integers, we may use the ratio of the two integer sets (K in this example) to scale down so that a subset of integers in the range [1, N] may be mapped to one integer in the range of [1, M]. The size of every subset may be the same or may be varied by ±1. To design/define G( ), which may map a smaller set of the integers to a larger set of integers, we may use the ratio of the two integer sets (K in this example) to scale up so that an integer in the range of [1, M] may be mapped to an integer in the range of [1, N] as a first step. Since N may be greater than M, some integers in the range of [1, N] may not be mapped. Therefore, in a second step, a random number may be drawn to spread the mapping to all the integer numbers in the range [1, N]. In a further example, a user specific value may be used. For example, the fixed value may be calculated though the WTRU ID, or through other IDs, and K. In one method, a user specific value may be determined using mod(WTRU ID, K).

In examples, frame formats may be considered where the UL frame format may depend on the division of the ID/control pool and data pool. For example, a time division double pool frame format may be used.

Figure 8A:
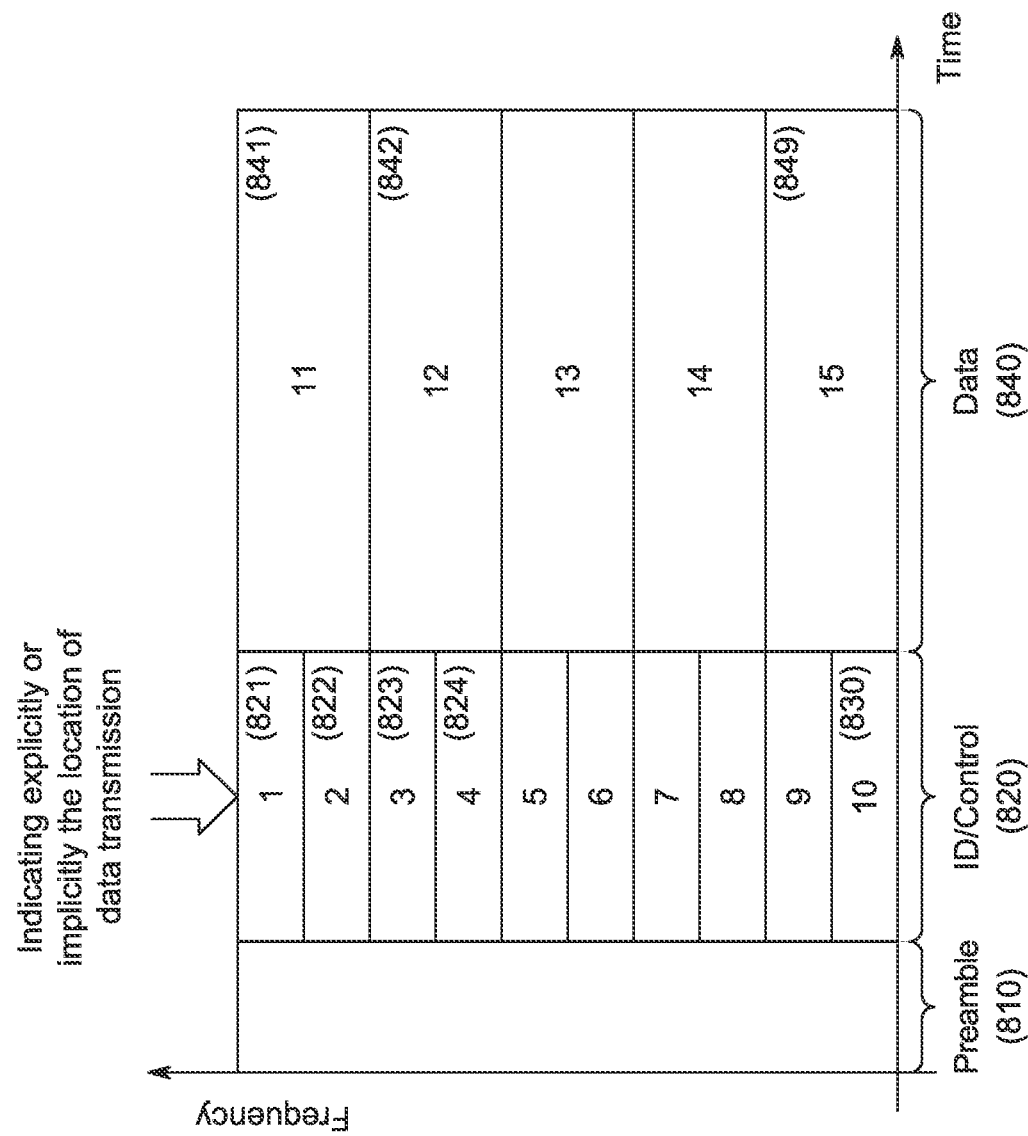
FIG. 8A is a frame format diagram illustrating an example of a time division double pool uplink (UL) GL frame format.

FIG. 8A is a frame format diagram illustrating an example of a time division double pool UL GL frame format. In an example shown in FIG. 8A, in a time division double pool frame format a common preamble 810 may be allocated across all or multiple subcarriers using the first one or several symbols. RBs allocated for ID/control pool 820, for example RB 1 (RB 821) through RB 10 (RB 830), may follow in time. These may then be followed by RBs allocated for data pool 840, for example RB 11 RB 841 through RB 15 849. In this example, ID/control pool and data pool allocation and the number of RBs available may be explicitly signaled. Mapping function F( ) and G( ) may be explicitly signaled in the ID/control information field or pre-defined/pre-determined. For instance, WTRUs that may use $RB_{2k+1}$ and $RB_{2k+2}$ in a control pool, may use $RB_{11+k}$ in a data pool. For each data resource, there may be two ID/control resources bonded. A WTRU transmitted on one of the bonded ID/control resources may use the corresponding data resources. The ID/control information, transmitted using ID/control resources, may indicate explicitly or implicitly the anticipated location of the data transmission, to be transmitted on data resources.

Once the ID/control information has been successfully detected, the base station may determine that whether data transmission has failed. In examples, the base station may be an eNode-B or a gNB. If a data transmission has failed, the base station may further determine whether the transmission failure is due to collision or too low SNR. For example, the base station may receive ID/control information on both RB1 (821) and RB2 (822), and it also may not detect a data transmission on RB 11 (841). In such an example, the base station may consider a collision may have occurred on RB 11 (841). In a further example, the base station may receive ID/control information on RB3 (823), no energy on RB4 (824), and may not detect a transmission on RB12 (842). In such an example scenario, the base station may consider the cause for the transmission failure as an SNR that is too low.

In further examples, frame formats may be considered where a frequency division double pool frame format may be used. Such examples may share some similarities with time division double pool frame formats.

Figure 8B:
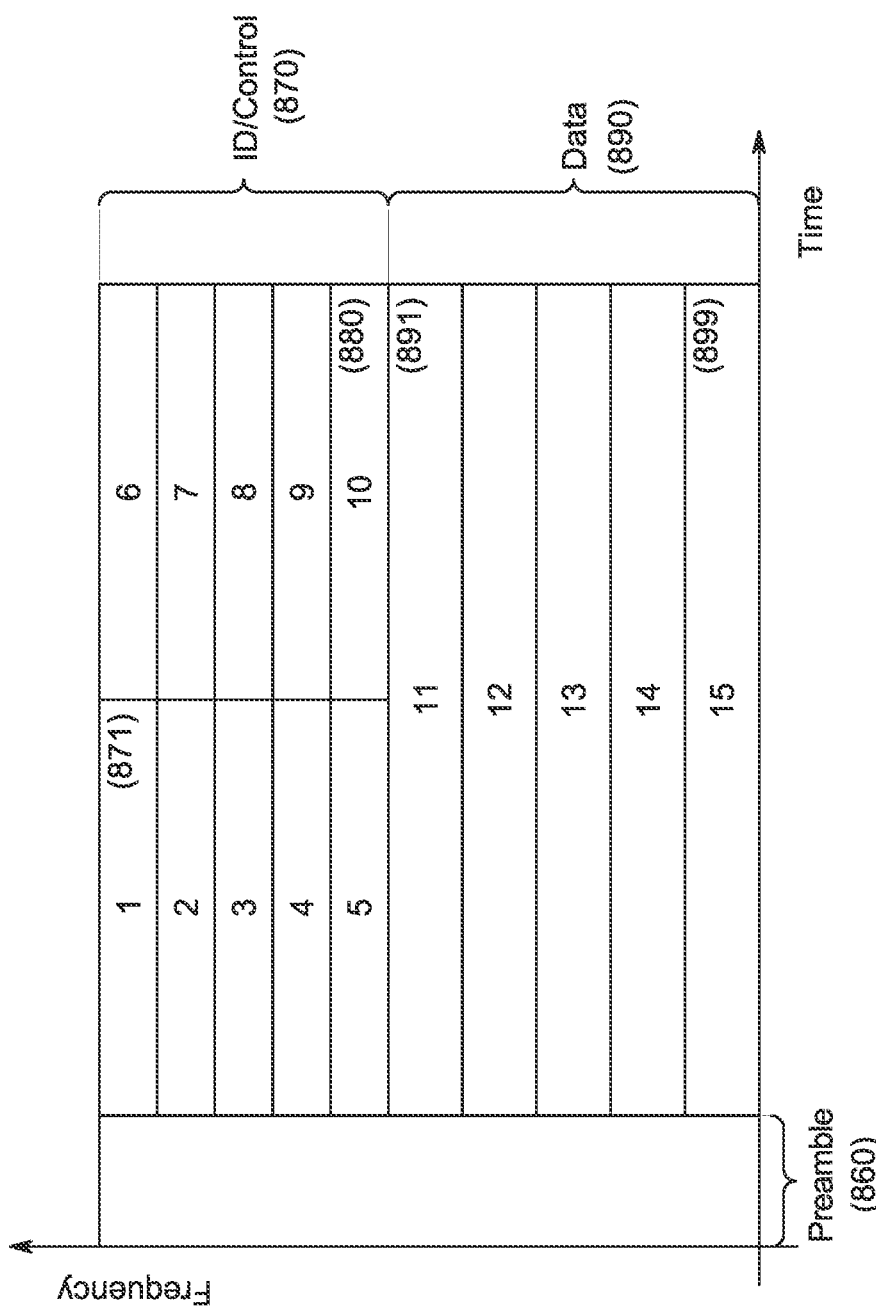
FIG. 8B is a frame format diagram illustrating an example of a frequency division double pool UL GL frame format.

FIG. 8B is a frame format diagram illustrating an example of a frequency division double pool UL GL frame format. In an example shown in FIG. 8B, a common preamble 860 may be allocated across all or multiple subcarriers using the first one or several symbols. RBs allocated for ID/control pool 870, such as RB 1 (871) through RB10 (880) may follow and use some frequency resources, for example upper RBs. Such upper RBs may be overlapping frequency resources. Further, RBs allocated for data pool 890, such as RB 11 (891) through RB 15 (899) may use the non-overlapping frequency resources. The signaling method and transmission failure determination method may be the same as detailed in the example with respect to FIG. 8A and accompanying text.

With the double contention pool method as described herein, acknowledgement and retransmission schemes may need to be designed to address possible transmission failures where the control/ID information may be transmitted separately from data information. Transmission failure reasons may be classified into classes.

In an example, transmission failure reasons may be classified into two classes. In a class, a transmission failure may be due to collision and a failed transmission may not be saved for HARQ combining. Further, retransmission may not consider HARQ gain and may be considered as an independent transmission. In a further class, a transmission failure may be due to low SNR and a failed transmission may be saved for HARQ combining. Further, retransmission may use Chase combining or incremental redundancy.

To address possible transmission failures there may be an acknowledgement procedure for GL transmissions. An eNode-B may setup a GL transmission opportunity in which WTRUs compete and transmit UL data. After reception of the UL GL transmission(s), the eNode-B may send acknowledgement(s) to the WTRU(s).

Assuming the GL transmission uses double contention pool based methods as described herein, the base station may send per-WTRU acknowledgement(s) in a unicast manner by a unified acknowledgment method or a separate acknowledgement method. Alternatively, or in addition to, a non-unicast manner such as a broadcast or multicast may be utilized. In one method, both per-WTRU acknowledgement and RB acknowledgement may be sent in an acknowledgement frame. The acknowledgement frame may have multiple parts. For example, the acknowledgement frame may have two parts. An example part may be a common information part which carries a RB acknowledgement. A further part may be a per-WTRU or WTRU specific information part. In the per-WTRU or WTRU specific information part, unified acknowledgement or separate acknowledgement methods may be applied.

In examples where a unified acknowledgement method is utilized, a single acknowledgment may be sent to each WTRU. In different example reception scenarios, the acknowledgement may vary and may have different meanings. In an example with a condition of an base station receiving ID/control information and data correctly, an acknowledgement (ACK) may be sent to indicate the successful reception. In examples, the base station may be an eNode-B or a gNB.

In an example with a condition of an base station receiving ID/control information but failing to receive Data, a negative acknowledgement (NAK) may be sent. In a further example, a subfield in the NAK may be used to indicate the reason for data transmission failure, such as due to collision, due to slow SNR, or due to an unknown failure. In a further example, the subfield in the NAK my indicate a score, such as a quantized value of probability, representing the estimated probability of each transmission failure. For example, the data transmission failure may be due to collision with 60% probability and low SNR with 40% probability.

In an example with a condition of an base station failing to receive ID/control information but receiving data information, nothing may be sent through per WTRU acknowledgement due to the loss of the ID. Then, the WTRU may look at an RB acknowledgement for more information. Further, the WTRU may use the information carried in the RB acknowledgement to determine the reason for the ID/control information reception failure.

In an example with a condition of an base station failing to receive ID/control information and failing to receive data information, may be sent through per WTRU acknowledgement due to the loss of the ID. Then, the WTRU may look at an RB acknowledgement for more information. Further, the WTRU may use the information carried in the RB acknowledgement to determine the reason for the ID/control information reception failure and/or the data information reception failure.

In some embodiments, the reason for data transmission failure may not be signaled explicitly in the acknowledgement. Further the WTRU may use the information carried in the RB acknowledgement to determine the reason, such as in the examples provided herein. In a further example, the WTRU may combine this information with information from other sources to determine the reason.

In examples where separate acknowledgements are utilized, a multiple acknowledgments may be sent to each WTRU, such as one acknowledgement for ID/control information, which may be referred to as ID ACK/NAK, and one acknowledgement for data, which may be referred to as data ACK/NAK. In different example reception scenarios, the acknowledgements may vary and have different meanings. In an example with a condition of an base station receiving ID/control information and data correctly, an ID acknowledgement (ID ACK) and a data acknowledgement (Data ACK) may be sent to indicate the successful reception.

In an example with a condition of an base station receiving ID/control information but failing to receive Data, an ID ACK may be sent and a data negative acknowledgement (Data NAK) may be sent. Further, a subfield in the Data NAK may be used to indicate the reason for data transmission failure, such as due to collision, due to slow SNR, or due to an unknown failure. Further, the subfield in the Data NAK may indicate a score, such as a quantized value of probability, representing the estimated probability of each transmission failure. For example, the data transmission failure may be due to collision with 60% probability and low SNR with 40% probability.

In an example with a condition of an base station failing to receive ID/control information but receiving data information, nothing may be sent through per WTRU acknowledgement due to the loss of the ID. Then, the WTRU may look at an RB acknowledgement for more information. Further, the WTRU may use the information carried in the RB acknowledgement to determine the reason for the ID/control information reception failure.

In an example with a condition of an base station failing to receive ID/control information and failing to receive data information, may be sent through per WTRU acknowledgement due to the loss of the ID. Then, the WTRU may look at an RB acknowledgement for more information. Further, the WTRU may use the information carried in the RB acknowledgement to determine the reason for the ID/control information reception failure and/or the data information reception failure.

In some embodiments, the reason for data transmission failure may not be signaled explicitly in the acknowledgement. Further the WTRU may use the information carried in the RB acknowledgement to determine the reason, such as in the examples provided herein. In a further example, the WTRU may combine this information with information from other sources to determine the reason.

In examples, RB acknowledgement(s) may be utilized. For example, the base station may indicate it may not successfully receive anything on certain RBs. Additionally or alternatively, the base station may indicate it may successfully receive information on certain RBs. In one example method, only RBs from ID/control pool may be acknowledged. In another method, RBs from both ID/control pool and data pool may be acknowledged. Note, this RB related acknowledgement may be transmitted in a multi-cast or broad-cast way.

In one method, a bitmap based RB acknowledgement may be used. The bitmap based RB acknowledgement signaling may include one or more of the following example approaches. For example, the signaling may include a number of RBs field. This field may be used to indicate the total number of RBs to be signaled. In a further example, this field may be used to indicate the total number of bits in the bitmap.

Further, the bitmap based RB acknowledgement signaling may include an RB ACK bitmap. For example, the RB ACK bitmap may be used to indicate the reception status on N RBs. For example, a value of 1 for the $n^{th}$ bit may indicate a successful reception on the $n^{th}$ RB. Additionally or alternatively, a value of 0 for the $n^{th}$ bit may indicate a transmission failure on the $n^{th}$ RB. The RB order may be specified or predefined in the system. For example, a RB order may follow the RB index in the time/frequency domain. For example, a time domain order may be considered first, and for the same time domain index, a frequency domain index may be considered. In a further example method, the RB indices may be used to signal the transmission failure, transmission success or both.

Figure 9:
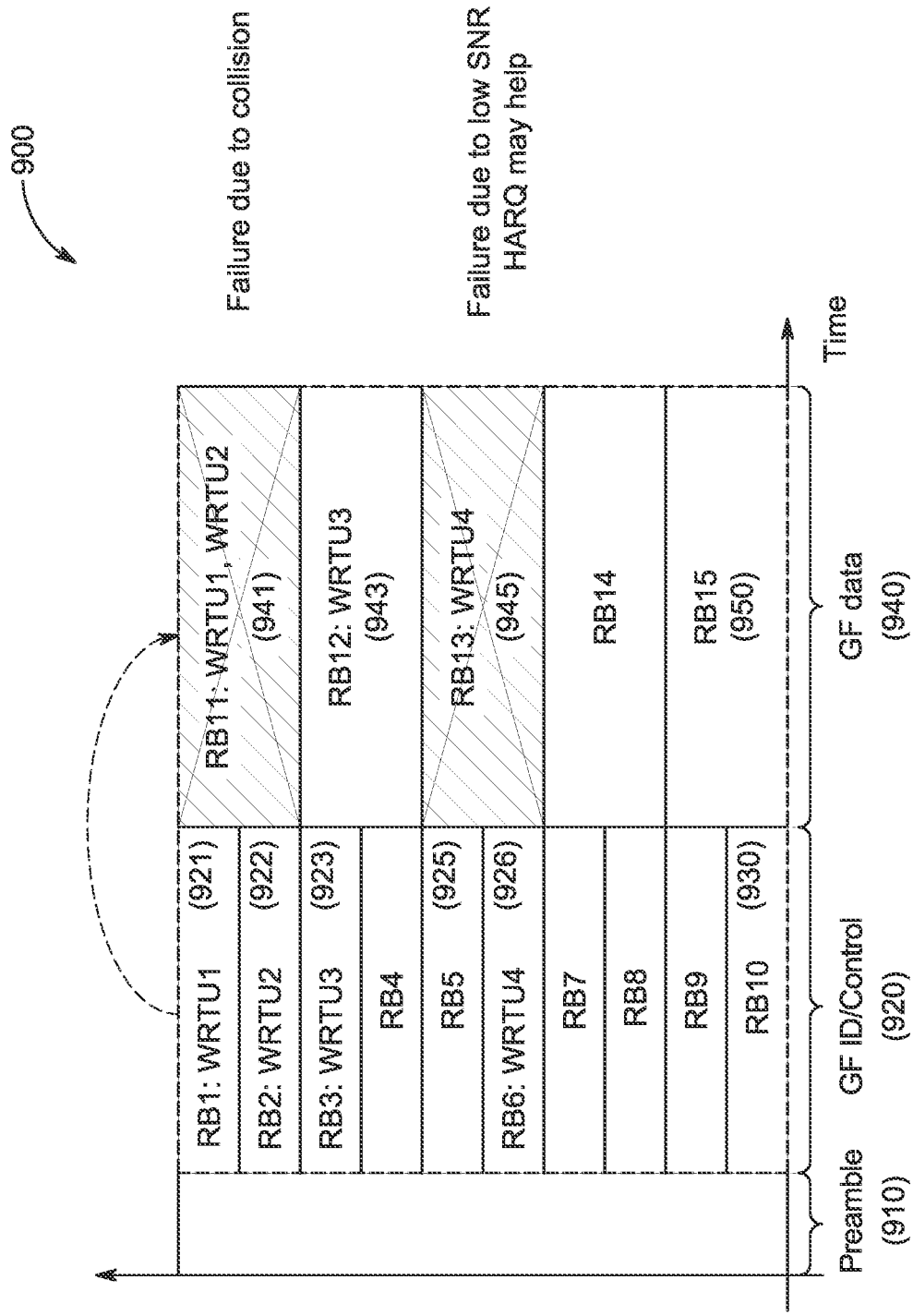
FIG. 9 is a frame format diagram illustrating an example of reception of a GL transmission at the base station.

FIG. 9 is a frame format diagram illustrating an example of reception of a GL transmission at the base station. Examples shown in frame format diagram 900 include an acknowledgment procedure which may be used with the concepts discussed herein. In examples, the base station may be an eNode-B or a gNB. In an example shown in FIG. 9, the base station may receive preamble 910. Further, the base station may set or configure ten RBs, such as RB1 (921) through RB10 (930) for a grant-free ID/control pool 920 and 5 RBs, such as RB11 (941) through RB15 (950) for a grant-free data pool 940. WTRU 1 through WTRU 4 may compete and transmit using UL GL transmission. In a similar example consistent with the examples provided in FIG. 9, the base station may configure RBs as a set for the grant-free ID/control pool 920 which includes ten subsets of RBs and may configure RBs as a set for the grant-free data pool 940, which includes five subsets of RBs. Further, the usage of the RBs may be set or configured as in Table 1.

TABLE 1

| Example usage of RBs |
|---|
| RB1: WTRU1 transmitted its ID/control information |
| RB2: WTRU2 transmitted its ID/control information |
| RB3: WTRU3 transmitted its ID/control information |
| RB6: WTRU4 transmitted its ID/control information |
| RB11: WTRU1 and WTRU2 transmitted data and collided |
| RB12: WTRU3 transmitted data |
| RB13: WTRU4 transmitted data |
| Rest of RBs are empty |

In an example of RB usage described in Table 1, per-WTRU unified acknowledgement using joint acknowledgement may be applied to examples in FIG. 9. For example, for WTRU1, a NAK may be sent where the reason for data transmission failure may be collision or collision with high probability. The base station may predict the data collision since it received ID/control on both RB1 (921) and RB2 (922) which may relate to data transmission on RB11 (941).

For WTRU2, a NAK may be sent where the reason for data transmission failure may be collision or collision with a high probability. The base station may predict the data collision since it received ID/control information on both RB1 (921) and RB2 (922) which may be related to data transmission on RB11 (941). For WTRU3, an ACK may be sent. For WTRU4, a NAK may be sent where the reason for data transmission failure may be low SNR or low SNR with a high probability. The base station may predict the data transmission failure due to low SNR since it received ID/control information on RB5 (925), while nothing has been received on RB6 (926). Further, according to the mapping function F(.), RB5 (925) and RB6 (926) may be the only two RBs in ID/control pool 920 related to RB13 (945) in data pool 940.

In another example of RB usage described in Table 1, per-WTRU unified acknowledgement using separate acknowledgement may be applied to example FIG. 9. For example, for WTRU1, an ID ACK and Data NAK may be sent where the reason for data transmission failure may be collision or collision with high probability. The base station may predict the data collision since it received ID/control on both RB1 (921) and RB2 (922) which may relate to data transmission on RB11 (941). For WTRU2, an ID ACK and Data NAK may be sent where the reason for data transmission failure may be collision or collision with high a probability. The base station may predict the data collision since it received ID/control information on both RB1 (921) and RB2 (922) which may be related to data transmission on RB11 (941). For WTRU3, an ID ACK and Data ACK may be sent. For WTRU4, an ID ACK and Data NAK may be sent where the reason for data transmission failure may be low SNR or low SNR with a high probability. The base station may predict the data transmission failure due to low SNR since it received ID/control information on RB5 (925), while nothing has been received on RB6 (926). According to the mapping function F(.), RB5 (925) and RB6 (926) may be the only two RBs in ID/control pool 920 related to RB13 (945) in data pool 940.

Further, RB acknowledgement(s) may be applied to examples in FIG. 9 and Table 1. For example, ACKs may be sent for RB1 (921), RB2 (922), RB3 (923), RB6 (926), and RB12 (943). Further, NAKs may be sent for RB11 (941) and RB13 (945).

FIG. 10 a flow diagram illustrating an example procedure for collision detection and signaling. In an example shown in flow diagram 1000, a base station may detect several uplink transmissions without grant in the allocated resources 1010, including ID resources and data resources. In examples, the base station may be an eNode-B or a gNB. The base station may check the ID field and determine whether the ID field was detected successfully 1020. If the base station detects energy in one ID field from a WTRU, but fails to decode valid information, it may determine a transmission failure on the ID field 1025. In one example, a base station may transmit an RB based NAK/acknowledgement indicating that it may experience transmission failure on the RB, which may carry an ID/control information. If the base station detects an ID field successfully, the base station may check the data field and determine whether the ID field was detected successfully 1030. If the base station receives the data field successfully, then the base station may send an ACK 1035. Otherwise, the base station may use the mapping function F( ) to determine whether other WTRU(s) may transmit using the same data RB(s) as the WTRU, which may include using the same RE(s) 1040. Note, the mapping function F( ) may be designed to map multiple ID/control fields to one data field. Explained differently, WTRUs that transmit on different ID/control fields may transmit on the same data field.

On a condition that other WTRU(s) are transmitting using the same RE(s) as the WTRU, and accordingly, where the WTRUs transmit on different ID/control fields and transmit on the same data field, there may be transmission failure due to collision(s) 1070. In the event of a transmission failure due to collision, the base station may take one or more of the following steps. For example, the base station may send a NAK with a collision/low SNR indication set to 1 back to the WTRU. In a further example, the base station may or may not remove the buffer depending on the measured signal to inference and noise ratio (SINR). In an additional example, the retransmission after failure determination may be self-decodable. An example of a self-decodable retransmission includes using retransmission version (RV)=0 and HARQ combining may not be performed. In another example, the base station may include a New Data Indicator (NDI) in the acknowledgement to request a new data transmission. In a further example, the base station may include the NDI in a configuration of the next GL transmission. If the base station includes the NDI for the next GL transmission, the base station may request all of the potential GL transmissions to be new transmissions. Further, the base station may allow the potential GL transmissions to be new transmissions.

On a condition that other WTRU(s) are not transmitting using the same RE(s) as the WTRU, and accordingly, where the WTRUs transmit on different ID/control fields and the WTRU do not transmit on the same data field, there may be transmission failure due to low SNR 1090. In the event of transmission failure due to low SNR, the base station may take one or more of the following steps. For example, the base station may send a NAK with a collision/low SNR indication set to 0 back to the WTRU In a further example, the base station may buffer the received data 1095. Further, the retransmission may use incremental redundancy (IR)/Chase combining (CC) HARQ. Also, HARQ combining may be performed. In another example, the base station may include an in the acknowledgement to request retransmission, where HARQ combination may be possible. In a further example, the base station may include the NDI in a configuration of next GL transmission. If the base station includes the NDI for the next GL transmission, the base station may request all of the potential GL transmissions to be retransmissions. Further, the base station may allow the potential GL transmissions to be retransmissions.

In an example, a base station may send a GL transmission configuration to a WTRU that may include a first indication of a first set of RBs for a first resource pool and a second indication of a second set of RBs for a second resource pool. The base station may be a gNB, in an example. The WTRU may then select a subset of RBs in the first set and may determine a subset of RBs in the second set based on the selected subset of RBs in the first set. Further, the WTRU may transmit UL data to the base station via the determined subset of RBs in the second set. The base station may determine whether the UL data has been received successfully from the WTRU. If the UL data has not been received successfully, the base station may determine, based on a first resource pool to second resource pool mapping, whether the WTRU and another WTRU have selected the subset of RBs of the second set. If the WTRU and another WTRU have selected the subset of RBs of the second set, the base station may transmit a NAK with a third indication for a first transmission failure reason. If the WTRU and another WTRU have not selected the subset of RBs of the second set, the base station may transmit a NAK with a third indication for a second transmission failure reason. The WTRU may then adjust a backoff and determine a retransmission scheme based on the received third indication. Further, the WTRU may retransmit the UL data to the base station using the adjusted backoff and the determined retransmission scheme.

In a further example, a total number of RBs in the first set may be greater than a total number of RBs in the second set. In an additional example, the first resource pool may be for at least one of WTRU ID information and control information for the WTRU, and the second resource pool may be for data information.

Further, the subset of RBs in the first set may be selected randomly. Also, the subset of RBs in the first set may be selected using a random access procedure and a backoff procedure. In an example, the random access procedure and the backoff procedure may be based on one or more of a WTRU priority, a traffic type of UL data, and the received one or more GL transmission configurations.

In addition, the first transmission failure reason may be due to UL collision and the second transmission failure reason may be due to UL low SNR. Further, if the third indication is for the first transmission failure reason, the adjustment may be increasing the backoff and the retransmission of the UL data may be self-decodable. Also, if the third indication is for the second transmission failure reason, the adjustment may be decreasing the backoff and the retransmission of the UL data may use IR/CC HARQ combining.

In another example, a time period between the reception of the GL configuration and a transmission of the UL data may be based on a backoff. Also, a time period between a transmission of the UL data and a retransmission of the UL data may be based on a backoff. Further, adjusting the backoff may include adjusting a backoff impact factor. In addition, the NAK may be an RB based NAK.

In a further example, the WTRU may transmit at least one of WTRU ID information for the WTRU and UL control information for the WTRU, via the selected subset of RBs in the first set, to a base station. In an example, the control information for the WTRU may include the WTRU ID. Also, the RBs may be within an RBG. Also, the mapping may use WTRU ID information for both WTRUs. In an additional example, if the UL data has been received successfully by the base station, the base station may send an ACK to the WTRU.

Examples procedures are provided herein for retransmission with a collision/low SNR indication. In example procedures, the WTRUs may adjust their retransmission scheme(s) to increase a probability of successful transmission perform collision control to decrease the collision probability, or both.

If a WTRU receives many NAKs with collision indications, the WTRU may determine that it is in a dense network and many WTRUs are competing for the GL transmission, at which point the WTRU may determine to back off. If a WTRU receives many NAKs with low SNR indications, the WTRU may determine to retransmit with a lower modulation and coding scheme, with a HARQ scheme, use more RBs for retransmission, or a combination of these.

Figure 11:
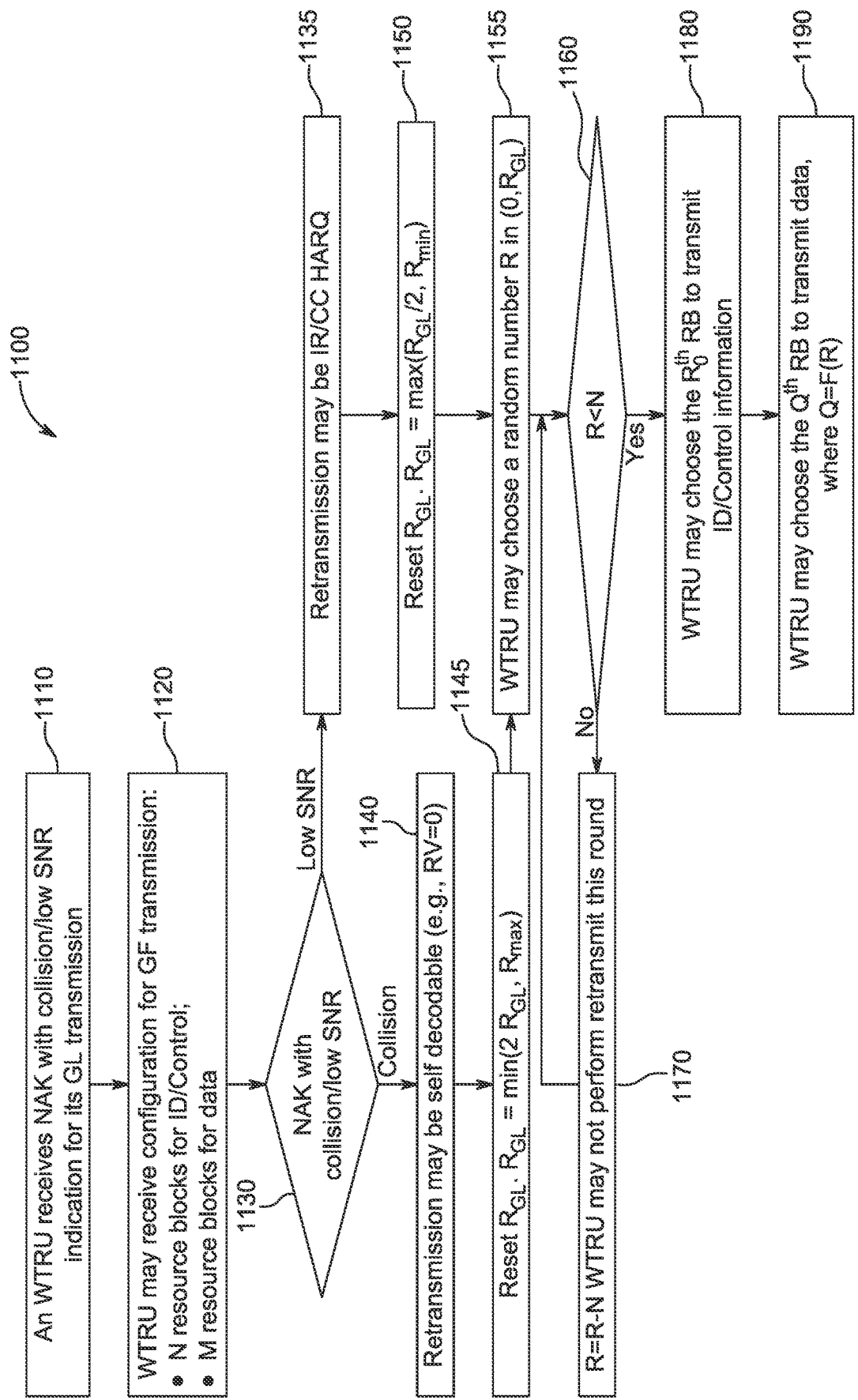
FIG. 11 is a flow diagram illustrating an example procedure for retransmission with a collision/low SNR indication.

FIG. 11 is a flow diagram illustrating an example procedure for retransmission with a collision/low SNR indication. In an example shown in flow diagram 1100, a WTRU may receive a NAK for its GL transmission 1110. With the NAK, there may be a collision/low SNR indication. The WTRU may receive a GL transmission configuration with N resource blocks for ID/control pools and M resource blocks for data pools 1120, where N>=M. The WTRU may have a predefined or predetermined mapping function F( ).

Based on the information carried in the NAK frame for a previous transmission, the WTRU may determine if a NAK with a collision indication or a NAK with low SNR was received 1130. If the WTRU receives a NAK with a collision indication, the WTRU may perform one or more of the following steps. In an example, the WTRU may prepare the retransmission with self-decodable coding schemes 1140. For example, the WTRU may use RV=0 for a retransmission. Accordingly, the WTRU may have an NDI included in the packet to indicate a new transmission. Further, with a collision indication, the WTRU may think the network is densely deployed and many WTRUs may try to transmit on the limited GL resources so the WTRU may reset/increase back off impact factor $R_{GL}$ 1145. For example, the WTRU may set $R_{GL}=\min(2R_{GL}, R_{max})$ where $R_{max}$ is a predefined or predetermined upper bound of $R_{GL}$. The WTRU may then proceed to step 1155, as explained more fully below.

Based on the information carried in the NAK frame for a previous transmission, if the WTRU receives a NAK with a low SNR indication, the WTRU may perform one or more of the following steps. In an example, the WTRU may prepare the retransmission with IR/CC HARQ coding schemes 1135. For example, the WTRU may use any retransmission version for retransmission and the WTRU may have an NDI included in the packet to indicate a retransmission. Further, the WTRU may think low SNR may be the reason for transmission failure and the WTRU may use a lower level modulation and coding scheme for a retransmission. the WTRU may reset or increase the number of allowed RBs $N_{RB}$, where the WTRU may be allowed to use more GL RBs. For example, the WTRU may set $N_{RB}=\min(2N_{RB},N)$ where N is the number of RBs allocated for GL transmission. Further the WTRU may reset/decrease back off impact factor $R_{GL}$ 1150. For example, the WTRU may set $R_{GL}=\max(R_{GL}/2,R_{min})$ where $R_{min}$ is a predefined or predetermined upper bound of $R_{GL}$. In one example, $R_{min}$ may be set as the number of resource blocks allocated for GL transmission, M or N, depending on whether an ID/control pool based random access procedure or a data pool based random access procedure is used, respectively. For example, with an ID pool based method, the random number will be compared with an ID/control pool size N, and with a data pool based method the random number will be compared with a data pool size M.

The WTRU may choose a random number R in the range [0, $R_{GL}$), where $R_{GL}$ is the back off impact factor 1155. If R<N, then one or more of the following example steps may also be taken. In an example, the WTRU may choose a new random number R0 in the range [0, N]. Further, the WTRU may set R0=R. Also, the WTRU may choose the $R0^{th}$ RB to transmit ID/control information 1180. Further, the WTRU may choose the $Q0^{th}$ RB to transmit data, where Q0=F(R0) 1190. Otherwise, if R<N is not true, then the WTRU may set R=R−N and the WTRU may back off and may not perform retransmission this time 1170.

The examples shown in FIG. 11 include an ID pool based random access and back off procedure, where the random number may be compared with the ID pool size N. Alternatively or additionally, the example may be extended to a data pool based random access and back off procedure where the random number may be compared with the data pool size M.

Figure 12:
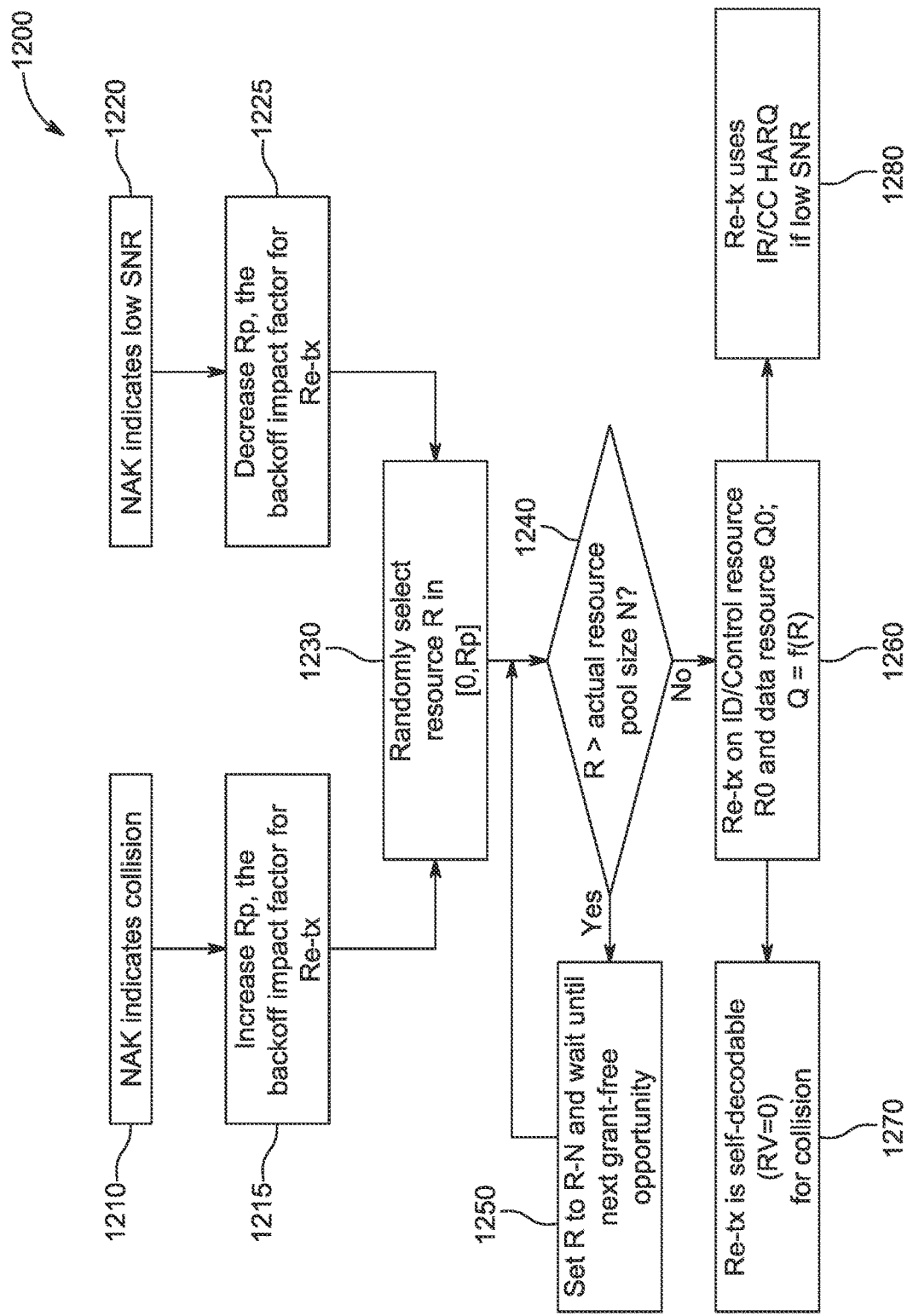
FIG. 12 is a flow diagram illustrating an example of a WTRU procedure with a collision/low SNR indication.

FIG. 12 is a flow diagram illustrating an example of a WTRU procedure with a collision/low SNR indication. In an example shown in flow chart diagram 1200, a WTRU may receive a NAK with a transmission failure indication. If the transmission failure indication is set to collision 1210, the WTRU may increase $R_p$, the back off impact factor for retransmission 1215. Further, there may be a maximum number $R_{max}$ predefined/predetermined/signaled where $R_p$ may not be bigger than the $R_{max}$. In an example, a NAK which indicates collision may be used in a dense network with many collisions. Increasing the back off impact factor for retransmission may reduce the chance of collision in a retransmission.

If the transmission failure indication is set to low SNR 1220, the WTRU may decrease $R_p$, the back off impact factor for retransmission 1225. The backoff factor may be marginally decreased because a large backoff may not be needed. Further, there may be a minimum number $R_{min}$ predefined/predetermined/signaled where $R_p$ may not be smaller than the $R_{min}$.

The WTRU may randomly select a number R in [0, $R_p$] 1230. The WTRU may determine whether R is bigger than the actual resource pool size N 1240. If R is bigger than the actual resource pool size N, then it may set R=R−N, back off and wait until the next grant-free transmission opportunity 1250. Accordingly, the WTRU may provide a random back-off to reduce collisions. If R is not than the actual resource pool size N, the WTRU may perform a retransmission on the R0th ID/control resource and Q0th data resource, where Q0=f(R0) 1260. In one example, R0 may be set to R. In another example, R0 may be a random value between 0 and N, where N is the resource pool size. Accordingly, the WTRU may typically not backoff for small values of $R_p$ and the backoff may not be needed if a transmission failure is due to low SNR.

For the retransmission, if the WTRU receives a NAK due to collision, the WTRU may perform a self-decodable coding scheme. For example, the WTRU may use a self-decodable RV in a retransmission, such as RV=0 1270. The WTRU may signal the RV in the retransmission. If the WTRU receives a NAK due to low SNR 1280, the WTRU may perform a retransmission with any RVs. The WTRU may or may not signal the RV used if it is with a preferred RV order. Further, the WTRU may use IR/CC HARQ in the retransmission.

In another example, WTRUs may maintain several counters for GL transmission failures. For example, the WTRU may have one or more of a collision counter, a low SNR counter, and/or a transmission failure counter. The collision counter may be used to count the number of transmission failures due to collision. In one example, this counter may be used to count the consecutive transmission failures due to collision and a successful transmission may reset the counter to 0. In another example, this counter may be for long term statistics where it may be an average number over a sliding window.

The low SNR counter may be used to count the number of transmission failures due to low SNR. In one example, this counter may be used to count the consecutive transmission failures due to low SNR, and a successful transmission may reset the counter to 0. In another example, this counter may be for long term statistics where it may be an average number over a sliding window.

The transmission failure counter may be used to count the number of transmission failures. In one example, this counter may be used to count the consecutive transmission failures due to collision and/or low SNR, and a successful transmission may reset the counter to 0. In another example, this counter may be for long term statistics where it may be an average number over a sliding window. In a further example, a first counter may be used for transmission failure due to collision and a second counter may be used for transmission failure due to low SNR.

In an example, if the collision counter is high or is bigger than a threshold, the WTRU may determine that it may be a dense network where many WTRUs may be competing for the GL transmission. In such a case, the WTRU may determine to back off.

If the low SNR counter is high or is bigger than a threshold, the WTRU may determine that it may need to retransmit with a lower modulation and coding scheme, with HARQ scheme, using more RBs for retransmission, or a combination of these.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed:

1. A method performed by a wireless transmit/receive unit (WTRU), the method comprising:
    receiving first configuration information for a first set of resources for a grantless physical uplink shared channel (PUSCH) transmission and second configuration information for a second set of resources for the grantless PUSCH transmission;
    determining data for transmission using the grantless PUSCH transmission;
    based on the data, selecting resources from either only the first set of resources for the grantless PUSCH transmission or only the second set of resources for the grantless PUSCH transmission, wherein the data is associated with at least the first set of resources; and
    sending the grantless PUSCH transmission including the data using the selected resources.

2. The method of claim 1, wherein the sending of the grantless PUSCH transmission is part of a random access procedure.

3. The method of claim 2, wherein the random access procedure is a two-step random access procedure.

4. The method of claim 2, wherein the random access procedure is a random access channel (RACH) procedure.

5. The method of claim 2, wherein the random access procedure depends upon collision conditions.

6. The method of claim 1, wherein the first configuration information and the second configuration information are received in one or more broadcast messages.

7. The method of claim 1, wherein the first configuration information and the second configuration information are received in one or more radio resource control messages.

8. The method of claim 1, wherein the first set of resources and the second set of resources each have contiguous resources.

9. The method of claim 1, wherein the first set of resources and the second set of resources are separated in at least one of time or frequency.

10. The method of claim 1, wherein a preamble is transmitted prior to the grantless PUSCH, wherein the transmitted preamble is based on the selected resources from the first set of resources or from the second set of resources.

11. A wireless transmit/receive unit (WTRU) comprising:
a transceiver; and
a processor operatively coupled to the transceiver; wherein:
the transceiver is configured to receive first configuration information for a first set of resources for a grantless physical uplink shared channel (PUSCH) transmission and second configuration information for a second set of resources for the grantless PUSCH transmission;
the processor is configured to determine data for transmission using the grantless PUSCH transmission;
the processor is configured to select, based on the data, resources from either only the first set of resources for the grantless PUSCH transmission or only the second set of resources for the grantless PUSCH transmission, wherein the data is associated with at least the first set of resources; and
the transceiver is configured to send the grantless PUSCH transmission including the data using the selected resources.

12. The WTRU of claim 11, wherein the sending of the grantless PUSCH transmission is part of a random access procedure.

13. The WTRU of claim 12, wherein the random access procedure is a two-step random access procedure.

14. The WTRU of claim 12, wherein the random access procedure is a random access channel (RACH) procedure.

15. The WTRU of claim 12, wherein the random access procedure depends upon collision conditions.

16. The WTRU of claim 11, wherein the first configuration information and the second configuration information are received in one or more broadcast messages.

17. The WTRU of claim 11, wherein the first configuration information and the second configuration information are received in one or more radio resource control messages.

18. The WTRU of claim 11, wherein the first set of resources and the second set of resources each have contiguous resources.

19. The WTRU of claim 11, wherein the first set of resources and the second set of resources are separated in at least one of time or frequency.

20. The WTRU of claim 11, wherein a preamble is transmitted prior to the grantless PUSCH, wherein the transmitted preamble is based on the selected resources from the first set of resources or from the second set of resources.

* * * * *